(12) United States Patent
Nakata

(10) Patent No.: US 6,523,101 B1
(45) Date of Patent: Feb. 18, 2003

(54) INSTALLED-SOFTWARE DEVELOPMENT ASSISTANCE SYSTEM

(75) Inventor: Junichi Nakata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/511,130

(22) Filed: Feb. 22, 2000

(30) Foreign Application Priority Data

Feb. 23, 1999 (JP) ............................................. 11-045324

(51) Int. Cl.[7] .............................................. G06F 13/00

(52) U.S. Cl. ........................ 711/169; 711/103; 711/154; 712/10

(58) Field of Search ................................ 711/103, 154; 712/10

(56) References Cited

U.S. PATENT DOCUMENTS

| 5,408,665 | A | * | 4/1995 | Fitzgerald | 707/10 |
| 5,481,708 | A | * | 1/1996 | Kukol | 717/155 |
| 6,185,578 | B1 | * | 2/2001 | Yokote et al. | 707/100 |
| 6,343,378 | B1 | * | 1/2002 | Moroda | 717/162 |

* cited by examiner

Primary Examiner—Reba I. Elmore
(74) Attorney, Agent, or Firm—Frommer Lawrence & Haug LLP; William S. Frommer; Glenn F. Savit

(57) ABSTRACT

In order to appropriately assign a plurality of programs to a plurality of storage devices, a header file and a source file are compiled by a compiling processing section so as to create an object file. The object file and a library file are linked by a link processing section in order to create an execution-format file. A plurality of execution-format files are linked by a complex execution-format file creation section in order to create a complex execution-format file on the basis of ROM information.

27 Claims, 27 Drawing Sheets

FIG. 10

| | |
|---|---|
| TEXT SECTION | 100,51 |
| INITIALIZATION DATA SECTION | 101,52 |
| INITIALIZATION-UNNECESSARY DATA SECTION | 102 |
| INITIALIZATION DATA SECTION | 103,54 |
| INITIALIZATION-UNNECESSARY DATA SECTION | 104 |
| INITIALIZATION DATA SECTION | 105,55 |
| INITIALIZATION DATA SECTION | 106,56 |
| INITIALIZATION-UNNECESSARY DATA SECTION | 107 |
| WORK AREA | 108 |
| INITIALIZATION-PROGRAM TEXT SECTION | 109,57 |
| INITIALIZATION-PROGRAM INITIALIZATION-DATA SECTION | 110,58 |
| INITIALIZATION-PROGRAM INITIALIZATION-UNNECESSARY-DATA SECTION | 111 |

FIG. 16

| STORAGE DEVICE NAME | ADDRESS | SIZE |
|---|---|---|
| STORAGE DEVICE NAME | ADDRESS | SIZE |

| STORAGE DEVICE NAME | ADDRESS | SIZE | NONVOLATILE-PROPERTY INFORMATION | WRITABILITY INFORMATION | ACCESS SPEED |
|---|---|---|---|---|---|
| STORAGE DEVICE NAME | ADDRESS | SIZE | NONVOLATILE-PROPERTY INFORMATION | WRITABILITY INFORMATION | ACCESS SPEED |
| STORAGE DEVICE NAME | ADDRESS | SIZE | NONVOLATILE-PROPERTY INFORMATION | WRITABILITY INFORMATION | ACCESS SPEED |
| STORAGE DEVICE NAME | ADDRESS | SIZE | NONVOLATILE-PROPERTY INFORMATION | WRITABILITY INFORMATION | ACCESS SPEED |
| ⋮ | ⋮ | ⋮ | ⋮ | ⋮ | ⋮ |

| MODULE NAME | TEXT SIZE | INITIALIZATION DATA SIZE | INITIALIZATION-UNNECESSARY DATA SIZE |
|---|---|---|---|
| MODULE NAME | TEXT SIZE | INITIALIZATION DATA SIZE | INITIALIZATION-UNNECESSARY DATA SIZE |
| MODULE NAME | TEXT SIZE | INITIALIZATION DATA SIZE | INITIALIZATION-UNNECESSARY DATA SIZE |
| MODULE NAME | TEXT SIZE | INITIALIZATION DATA SIZE | INITIALIZATION-UNNECESSARY DATA SIZE |
| MODULE NAME | TEXT SIZE | INITIALIZATION DATA SIZE | INITIALIZATION-UNNECESSARY DATA SIZE |
| ⋮ | ⋮ | ⋮ | ⋮ |

180 181 182 183

INSTALLED-SOFTWARE DEVELOPMENT ASSISTANCE SYSTEM

BACKGROUND OF THE INVENTION

1. Field of the Invention

The present invention relates to an installed-software development assistance system which is suitably used, for example, in cases in which software systems to be installed are developed.

2. Description of the Related Art

In recent years, in various types of electronic apparatuses, often, a microcomputer and a program which operates on this microcomputer are installed, and various types of control are performed by software. In general, such an electronic apparatus comprises a software system 500 to be installed, such as that shown in FIG. 25.

The software system 500 to be installed comprises a CPU (Central Processing Unit) 501 which executes a program, a RAM (Random Access Memory) 502, a ROM (Read Only Memory) 503, an EEPROM (Electrically Erasable ROM) 504, and an input/output device 505. The CPU 501 is connected to other component devices through a bus 506 and performs communication with the other component devices via the bus 506. The program has been stored in the ROM 503.

The CPU 501 reads a program and executes it, performing a computation in accordance with various signals input from the input/output device 505 and outputting the computation result to the input/output device 505. For the program execution form, there are cases in which the CPU 501 reads text codes from the program stored in the ROM 503 via the bus 506, and the program is directly executed in the CPU 501, and there are other cases in which text codes read by the CPU 501 are copied once into the RAM 502, and these copied text codes are read from the RAM 502 and are executed.

Generally, the ROM 503 has an access speed which is slower than that of the RAM 502. For this reason, normally, in either case, the data codes in the program are copied into the RAM 502 and are used. In the software system 500 to be installed, when the execution speed of the program is increased, it is preferable that the text codes stored on the ROM 503 be copied once into the RAM 502 and that the CPU 501 execute the text codes copied into the RAM 502. However, in the software system 500 to be installed, when the text codes are to be copied into the RAM 502, the size required for the RAM 502 is increased by an amount corresponding to the text codes, resulting in increased cost.

Also, in the software system 500 to be installed, since the EEPROM 505 is rewritable, and furthermore, since memory can be maintained even when power supply is stopped, there are cases in which text codes and data codes which may be changed are held in the EEPROM 505.

In the above-described software system 500 to be installed, a program stored in the ROM 503 is generally developed by a software development system 510 such as that shown in FIG. 26. In the following, a description is given by using a case, as an example, in which C language is used as a programming language; however, basic processing is also the same for cases in which other programming languages are used.

In the software development system 510, a header file 511 and a source file 512 are files to be prepared by the user. The header file 511 and the source file 512 may be files created by the user, and may be files selected by the user, which files are prepared in advance by the software development system 510.

Compiling information 513 is optional information which specifies a compiling form with respect to a compiler 514, for example, the type of CPU 501, instructions for optimization, etc.

A compiling processing section 515 compiles the source file 512 by using the compiler 514 suitable for target hardware, the compiling information 513, and the header file 511 in order to create an object file 516.

A library file 517 may be a library which is prepared in advance by the software development system 510 or may be a library created by the user.

Link information 518 is an optional information which specifies a link form with respect to a linker 519.

ROM information 520 is the starting address information of the RAM 502 and/or the ROM 503.

A link section 521 links a plurality of object files 516 by using the linker 519 suitable for target hardware, the library file 517, the link information 518, and the ROM information 520, in order to create one execution-format file 522. This execution-format file 522 contains text codes and data codes.

The completed execution-format file 522 is written into the ROM 503 and is installed into the software system 500 to be installed. When the execution-format file 522 is executed by the CPU 501, there is a case in which the execution-format file 522 is directly executed from the ROM 503 by the CPU 501 in accordance with the setting in the ROM information 520, and there is another case in which the execution-format file 522 is executed by the CPU 501 after the file is copied once into the RAM 502.

Next, the software development procedure in the software development system 510 is described. In the following, a first example shown in FIG. 27 is described.

In the first example, as shown in FIG. 27, initially, a system library 523, a system source file 524, and a user source file 525 are prepared. The system library 523 corresponds to the library file 517 in FIG. 26. The system library 523 is a library containing a program which is, for example, provided by the software development system 510 and which realizes the functions of an OS.

The system source file 524 corresponds to the source file 512 in FIG. 26. The system source file 524 is a source file containing a program which is, for example, provided by the software development system 510 and which realizes the functions of an OS. The system source file 524, in general, is often distributed only to the hardware-dependent portion in the program which is finally completed. The user source file 525 corresponds to the system source file 524 in FIG. 26, and is a source file created for the control of an electronic apparatus by the user.

In the first example, the compiling processing section 515 compiles the system source file 524 and the user source file 525, thereby creating an object file 526 and an object file 527, respectively. The object file 526 and the object file 527 correspond to the object file 516 in FIG. 26.

Next, the link section 521 links the system library 523, the object file 526, and the object file 527, thereby creating one execution-format file 522.

The execution-format file 522 comprises, for example, as shown in FIG. 28, internal structure information 530, a text section 531, an initialization data section 532, an initialization-unnecessary-data section 533, and a debugging information section 534. As forms of such an execution-format file 522, specifically, for example, ELF (Executable and Linking Format), COFF (Common Object File Format), etc., are known.

The internal structure information 530, which is positioned at the start portion of the execution-format file 522, contains information for identifying the contents of the portions which follow, information for the length thereof, etc. By analyzing this internal structure information 530, necessary information can be extracted from the portions which follow.

As shown in FIG. 27, the text section 531 is program codes which are assembled from each of the system library 523, the object file 526, and the object file 527 and are linked.

The initialization data section 532 is an initial-value data area for variables which are assembled and linked in a similar manner.

The initialization-unnecessary-data section 533 is a data area for variables, in which initial values are not determined, which are assembled and linked in a similar manner.

The debugging information section 534 is an area in which symbol information, such as variable names, is stored for the purpose of debugging programs.

When the execution-format file 522 is installed into the software system 500 to be installed, it is written into the ROM 503, for example, in the structure such as that shown in FIG. 29, forming an execution program 540. That is, of the execution-format file 522, the internal structure information 530, the initialization-unnecessary-data section 533, and the debugging information section 534 are not written onto the ROM 503, and only the text section 531 and the initialization data section 532 are written. Also, at this time, by referring to the internal structure information 530, the text section 531 and the initialization data section 532 are extracted from this execution-format file 522.

In the software system 500 to be installed, when the execution program 540 written into the ROM 503 is executed by the CPU 501, as shown in FIG. 30, the initialization data section 532 is copied from this execution program 540 into the RAM 502, and the initialization-unnecessary-data section 533 is created in the RAM 502. At this time, the initialization data section 532 copied into the RAM 502 is copied from the execution program 540 stored on this ROM 503 in accordance with the starting address and the copy size indicated in the text section 531 on the ROM 503. Also, the initialization-unnecessary-data section 533 created in the RAM 502 is created by the software system 500 to be installed in accordance with the information indicated in the text section 531 on the ROM 503.

In the software system 500 to be installed, when the execution program 540 is written onto the ROM 503 on the basis of the execution-format file 522 developed by the above-described first procedure, the text section 531 is not copied to the RAM 502 and is directly executed from the ROM 503 by the CPU 501. In this case, setting indicating that the text section 531 is not copied to the RAM 502 is made in the ROM information 520 in the software development system 510.

Next, a method for starting the execution program 540 in the software system 500 to be installed is described with reference to FIG. 31.

In step S550, the starting of the execution program 540 is begun.

In step S551, the CPU 501 reads the text section 531 stored in the ROM 503, which starts from the specific address corresponding to the type of CPU 501, and executes it.

In step S552, the CPU 501 initializes the RAM 502, the input/output device 505, etc., in accordance with a program in the text section 531.

In step S553, the CPU 501 copies the initialization data section 532 on the ROM 503 into the RAM 502 in accordance with the program in the text section 531.

In step S554, the CPU 501 creates the initialization-unnecessary-data section 533 in the RAM 502 in accordance with the program in the text section 531.

In step S555, the CPU 501 executes a program code which follows the text section 531 while accessing the initialization data section 532 and the initialization-unnecessary-data section 533 in the RAM 502.

In step S556, the operation of the execution program 540 is terminated.

In the above description, the first example which is a case in which the text section 531 is not copied into the RAM 502 is described. In the following, a second example in which a text section 531 is copied into the RAM 502 is described with reference to FIGS. 32 to 36. In the following, descriptions of portions which are duplicates of the above description are omitted, and corresponding numerals are used in the drawings.

In the software development procedure by the software development system 510 in accordance with the second example, as shown in FIG. 32, in addition to the system library 523, the system source file 524, and the user source file 525, a boot source file 560 is prepared. The boot source file 560 corresponds to the source file 512 in FIG. 26, and contains a processing command for copying the text section 531 from the ROM 503 into the RAM 502.

In the second example, in a manner similar to that of the first example, the compiling processing section 515 creates the object file 526 and the object file 527 and compiles the boot source file 560, thereby creating a boot object file 561. Then, the link section 521 creates the execution-format file 522 in a manner similar to that in the first example, and the boot object file 561 is linked with the system library 523, thereby creating a boot program 562. The boot program 562 has an internal structure similar to that of the execution-format file 522.

In this second example, the execution-format file 522 and the boot program 562, created in the above manner, are written into the ROM 503 in a structure such as that shown in FIG. 33, forming an execution program 570. That is, the execution program 570 is composed of a boot code 571, a copy block information group 572, an execution starting address 573, a text section 531, and an initialization data section 532.

The boot code 571 is a text code of the boot program 562 and corresponds to the text section 531 of the execution-format file 522. The copy block information group 572 is information of data to be copied from the ROM 503 to the RAM 502. The execution starting address 573 indicates the address at which the execution of the text section 531 is started after copying.

The copy block information group 572, as shown in FIG. 34, has a copy source address 574, a copy source size 575, a copy target address 576, a copy target size 577, a text section 531, an initialization data section 532, and an initialization-unnecessary-data section 533.

The copy source address 574 is a starting address at which copying of each section stored on the ROM 503 is started. The copy source size 575 is the size of each section to be read from the ROM 503. The copy target address 576 is a starting address of each section in the RAM 502. The copy target size 577 is the size of each section in the RAM 502.

The text section 531 and the initialization data section 532 generally correspond to the copy source size 575 and the copy target size 577, but may differ depending on the alignment required by the CPU 501. For the initialization-unnecessary-data section 533, an invalid value is set in the copy source address 574, and "0" is set in the copy target address 576.

In the software system 500 to be installed, when the CPU 501 executes the execution program 570 written into the ROM 503, as shown in FIG. 35, the text section 531 and the initialization data section 532 are copied from this execution program 570 into the RAM 502, and the initialization-unnecessary-data section 533 is created in the RAM 502. At this time, the text section 531 and the initialization data section 532 are copied from the ROM 503 into the RAM 502 by referring to the copy block information group 572 by the CPU 501 in accordance with the boot code 571. In a similar manner, the initialization-unnecessary-data section 533 is created in the RAM 502 by referring to the copy block information group 572 by the CPU 501 in accordance with the boot code 571.

The software system 500 to be installed copies the text section 531 and the initialization data section 532 from the execution program 570 on the ROM 503 developed by the above-described second procedure, and creates the initialization-unnecessary-data section 533 in the RAM 502, and the CPU 501 executes the text section 531 copied into the RAM 502. In this case, setting indicating that the text section 531 is to be copied to the RAM 502 is made in the ROM information 520 of the software development system 510.

Next, a method for starting the execution program 570 in the software system 500 to be installed is described with reference to FIG. 36.

In step S580, the CPU 501 starts the execution program 570.

In step S581, the CPU 501 reads the boot code 571 and executes it.

In step S582, the CPU 501 initializes the RAM 502, the input/output device 505, etc., in accordance with the program in the boot code 571.

In step S583, the CPU 501 refers to the copy block information group 572 in accordance with the program in the boot code 571, and copies the text section 531 on the ROM 503 into the RAM 502.

In step S584, the CPU 501 refers to the copy block information group 572 in accordance with the program in the boot code 571, and copies the initialization data section 532 on the ROM 503 into the RAM 502.

In step S585, the CPU 501 refers to the copy block information group 572 in accordance with the program in the boot code 571, and creates the initialization-unnecessary-data section 533 in the RAM 502.

In step S586, the CPU 501 refers to the copy block information group 572 in accordance with the program in the boot code 571, and executes the program code of the text section 531 in the RAM 502 while accessing the initialization data section 532 and the initialization-unnecessary-data section 533 in the RAM 502.

In step S587, the operation of the execution program 570 is terminated.

In a software system to be installed, such as in that described above, there has been a demand for programs to be formed into modules from the- viewpoint of ease of installation into electronic apparatuses and expandability of functions. Also, in recent years, there has been a demand for electronic apparatuses to include various communication functions. For example, electronic apparatuses, which are connected to a telephone line, having functions for performing various types of communication over a network, and electronic apparatuses having functions for performing transmission and reception of various software modules via a network have been developed.

It is preferable that a software system to be installed which is installed into such an electronic apparatus support various communication functions and software module transmission and reception functions at the level of an operating system (OS), which is basic software. Also, it is preferable that a software system to be installed be capable of concurrently executing a plurality of programs which are formed into modules.

However, there is a problem in that since a conventional software development system 510 basically uses one execution-format file 522 as an object, a plurality of execution-format files 522 cannot be concurrently handled. Also, it is difficult for the conventional software development system 510 to appropriately assign a plurality of execution-format files 522 to each storage device in a case in which a plurality of various storage devices, such as not only a RAM 502 and a ROM 503, but also an EEPROM 504, can be used, and it is difficult for the conventional software development system 510 to appropriately adjust the locations of addresses on each storage device.

SUMMARY OF THE INVENTION

Accordingly, it is an object of the present invention to provide an installed-software development assistance system which is capable of appropriately and easily assigning a plurality of programs to a plurality of storage devices.

In one aspect, the information processing apparatus in accordance with the present invention comprises a program location determination section for determining which one of a plurality of storage devices is to be used to store and/or execute at least one program. The program location determination section performs the determination on the basis of priority information indicating the priority of each of the programs.

In the information processing apparatus constructed as described above, since the program location determination section determines which one of the storage devices is used to store and/or execute each program on the basis of priority information, it is possible to appropriately assign a plurality of programs to a plurality of storage devices.

In another aspect, the information processing method in accordance with the present invention is an information processing method for assigning programs to be executed by a program execution section having at least a computation device and a plurality of storage devices to determine which one of the storage devices is to be used to store and/or execute at least one program. Also, the information processing method in accordance with the present invention comprises reading priority information indicating the priority of each of the programs; and determining the assignment of each of the programs on the basis of the priority information.

Therefore, according to the information processing method of the present invention, it is possible to appropriately and easily assign a plurality of programs to a plurality of storage devices.

In another aspect, the program writing apparatus in accordance with the present invention is a program writing apparatus for writing at least one program into a program execution section having at least a computation device and a plurality of storage devices. The program writing apparatus in accordance with the present invention comprises a program location determination section and a program writing section. The program location determination section determines which one of the storage devices is to be used to store and/or execute at least one of the programs on the basis of priority information indicating the priority of each program. The program writing section writes each of the programs into a respective one of each of the storage devices, in accordance with the determination result of the program location determination section.

In the program writing apparatus constructed as described above, the program location determination section determines which one of the storage devices is used to hold and/or execute at least one program on the basis of priority information. Based on this determination result, the program location section locates each program in each storage device. This makes it possible for a plurality of programs to be appropriately assigned and written into each storage device.

The above and further objects, aspects and novel features of the invention will become more apparent from the following detailed description when read in connection with the accompanying drawings.

BRIEF DESCRIPTION OF THE DRAWINGS

FIG. 10 illustrates the state of an execution program on a storage device for execution according to the present invention.

FIG. 16 illustrates an example of storage device information of the software development apparatus.

FIG. 17 illustrates another example of storage device information of the software development apparatus.

FIG. 19 illustrates module size information of the software development apparatus.

DESCRIPTION OF THE PREFERRED EMBODIMENT

An embodiment of the present invention will be described below in detail with reference to the drawings. The present invention is suitably used in a case in which a software system to be installed such as that described above is to be developed. In the following description, a RAM, a ROM, etc., provided in the software system to be installed, are collectively referred to as "storage devices". The software system to be installed controls various types of electronic apparatuses by causing a processor apparatus, such as a CPU, to execute a program held in a storage device in the above-described manner.

Also, in the following description, of various types of storage devices included in the software system to be installed, a storage device for holding a program is called a "storage device for storage", and a storage device to which a program held in this storage device for storage is copied when this program is executed by a processor apparatus, such as a CPU, is called a "storage device for execution".

Figure 1:
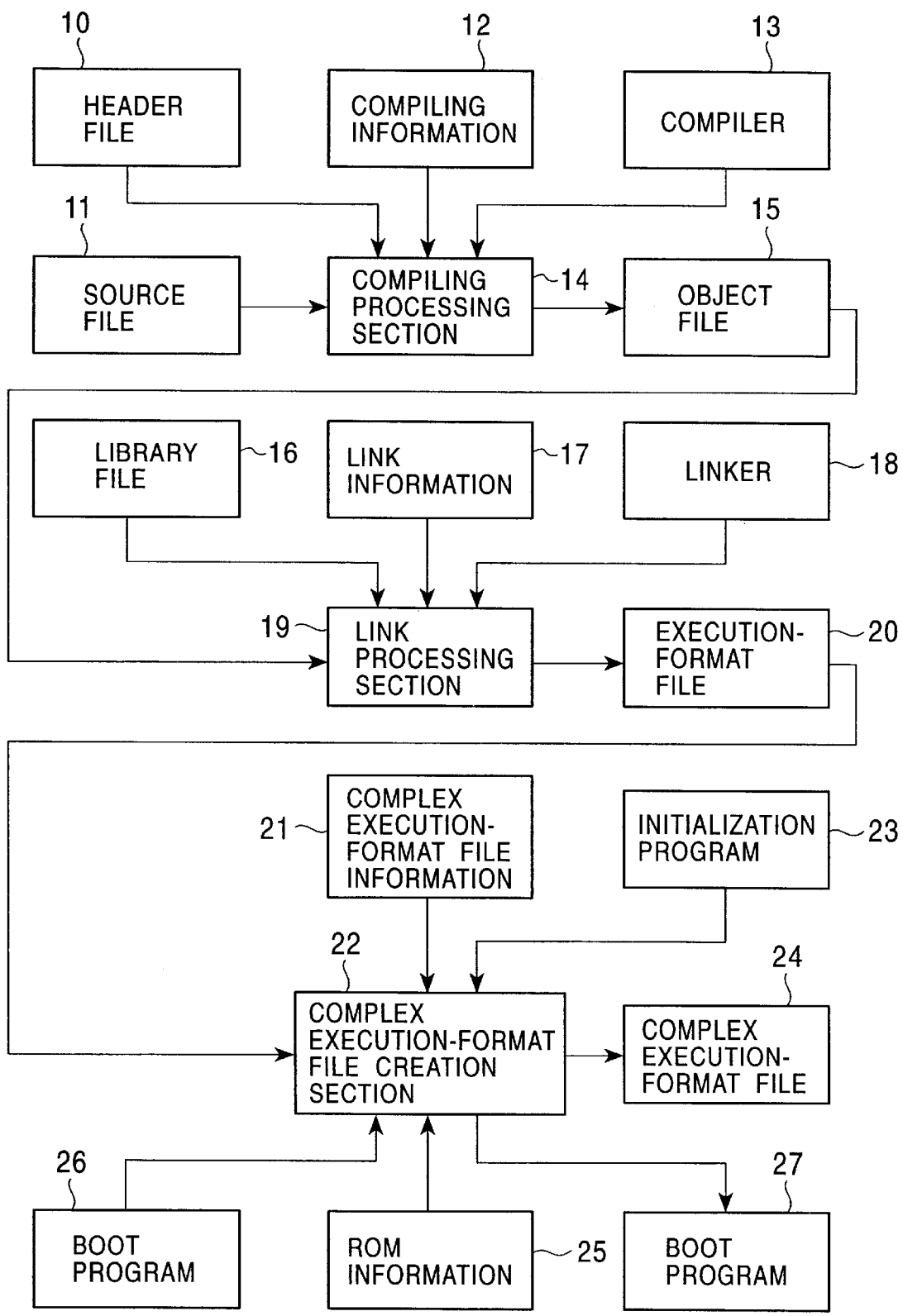
FIG. 1 is a block diagram showing an example of the construction of a software development system according to the present invention.

The software development system which is applied to the present invention is described first with reference to FIG. 1. FIG. 1 shows an example of the construction of a software development system to which the present invention is applied. In the following, a description is given by using a case, as an example, in which the C language is used as a programming language; however, basic processing is also the same for cases in which other programming languages are used.

A header file 10 and a source file 11 are files prepared by the user. These files may be files created by the user, and may be files provided by the software development system.

Compiling information 12 is optional information which specifies a compiling form with respect to a compiler 13, for example, the type of target processor apparatus of the software system to be installed, instructions for optimization, etc. This compiling information 12 is created by a system setting section (not shown in FIG. 1) to be described later, and contains, for example, information such as that described below:

Names of compilers, and the directory thereof
   Compile options which specify a processor apparatus that executes a program
   Directory information of header files to be read
   Use or non-use of floating-point arithmetic unit
   Definition of macro values for preprocessor, contained in the source file.

A compiling processing section 14 compiles the source file 11 by using the header file 10, the compiling information 12, the compiler 13, etc., which are suitable for the target software system to be installed, in order to create an object file 15.

A library file 16 may be a library provided by the software development system, and may be a library created in advance by the user.

Link information 17 is optional information which specifies a link form with respect to a linker 18. The link information 17 is created by the system setting section, and contains, for example, information such as that described below:

Names of linkers, and the directory thereof
   Setting of output file form, and link option of debugging information addition
   Information of library to be linked
   Comprehensive information (indicates which files should be linked among a plurality of object files) of object files contained in library file.

A link information section 19 links the object file 15 by using the library file 16, the link information 17, the linker 18, etc., which are suitable for the target software system to be installed, and performs appropriate assignment in memory space when necessary in order to create an execution-format file 20. This execution-format file 20 is created in a form in which the location address can be changed (relocatable) by a complex execution-format file creation section 22 (to be described later). Execution-format files output by a conventional software development system are not always created in a relocatable form.

Complex execution-format file information 21 holds information for the execution-format file 20 to be contained in a complex execution-format file 24 (to be described later), and is used in the complex execution-format file creation section 22. This complex execution-format file information 21 is created by the system setting section, and contains, for example, information such as that described below:

Module names of execution-format files contained in complex execution-format files, file names, and the directory thereof
   Data (stack area size, heap area size, operation mode, operation priority, etc.) of module attribute information which should be assigned to each execution-format file
   Execution starting address (included in the overall structure information to be described later, together with the number of modules) of initialization program
   Creation date of complex execution-format file, version, title, etc., (included in the overall structure information to be described later).

The complex execution-format file creation section 22 creates a complex execution-format file 24 by using a plurality of execution-format files 20 and an initialization program 23 on the basis of the information provided by the complex execution-format file information 21, and outputs the file. The initialization program 23 is a program for executing the complex execution-format file 24. Also, in a similar manner, the complex execution-format file creation section 22 creates a boot program 27 by using a boot program 26 on the basis of information provided by ROM information 25. The complex execution-format file creation section 22 may create the complex execution-format file 24 and the boot program 26 in an integrated manner and output it.

Next, a software development procedure according to the present invention is described with reference to FIG. 2.

A system source file 30 and a system source file 31 correspond to the source file 11 in FIG. 1, and are source files provided by the software development system. The compiling processing section 14 compiles the system source file 30 and the system source file 31 in order to create an object file 32 and an object file 33, respectively. The link processing section 19 links the object file 32 and the object file 33 created by the compiling processing section 14 with the library file 16, etc., in order to create an execution-format file 34 and an execution-format file 35, respectively.

A user source file 36 corresponds to the source file 11 in FIG. 1, and is a source file created by the user. In a manner similar to that described above, the compiling processing section 14 compiles the user source file 36 in order to create an object file 37. Also, the link processing section 19 links the object file 37 with the library file 16, etc., in order to create an execution-format file 38.

An initialization source file 39 corresponds to the source file 11 in FIG. 1, and is a source file containing a process for initializing target hardware. The compiling processing section 14 compiles the initialization source file 39 in order to create an initialization object file 40. Also, the link processing section 19 links the initialization object file 40 with the library file 16, etc., in order to create the initialization program 23.

A boot source file 41 corresponds to the source file 11 in FIG. 1, and is a source file containing a process for booting up the target software system to be installed. The compiling processing section 14 compiles the boot source file 41 in order to create a boot object file 42. Also, the link processing section 19 links the boot source file 41 with the library file 16, etc., in order to create the boot program 26.

An execution-format file 34, an execution-format file 35, and an execution-format file 38 correspond to the execution-format file 20 in FIG. 1. Also, the initialization program 23 and the boot program 26 are created in a form in which location addresses can be changed (relocatable) by the complex execution-format file creation section 22.

The complex execution-format file creation section 22 creates the complex execution-format file 24 by using the execution-format file 34, the execution-format file 35, the execution-format file 38, and the initialization program 23 on the basis of the information provided by the ROM information 25. Also, in a similar manner, the complex execution-format file creation section 22 creates the boot program 27 containing the information of the complex execution-format file 24 by using the boot program 26 on the basis of the information provided by the ROM information 25. The boot program 27 is created in a form in which location addresses are fixed (not relocatable).

Figure 2:
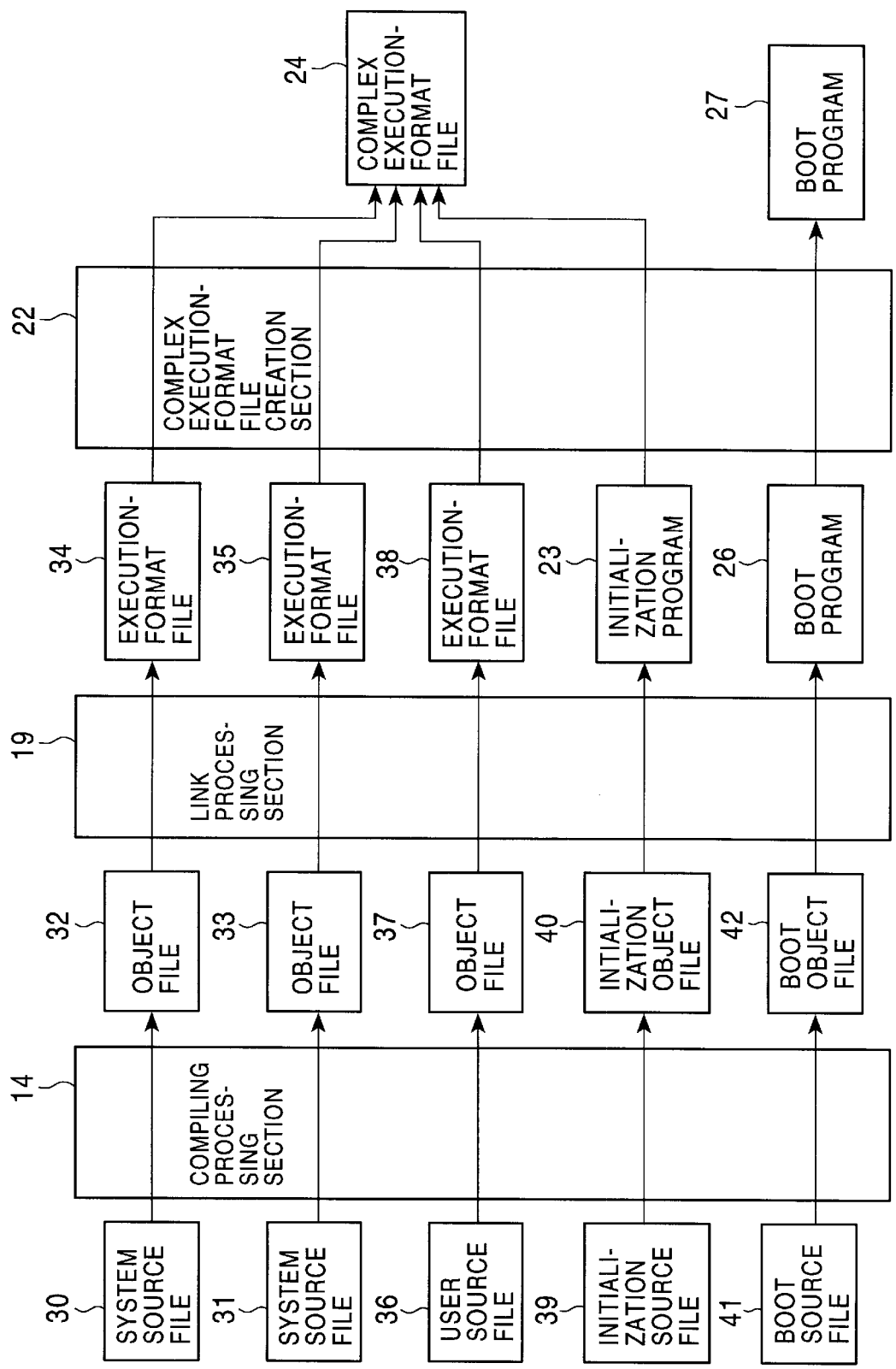
FIG. 2 is a block diagram showing a software development procedure in the software development system.

In FIG. 2, a case is described in which the complex execution-format file 24 is created by using the execution-format file 34, the execution-format file 35, the execution-format file 38, and the initialization program 23. In the software development procedure in accordance with the present invention, however, the number of execution-format files is not so limited, and the complex execution-format file 24 can be created by using a plurality of execution-format files.

Figure 3:
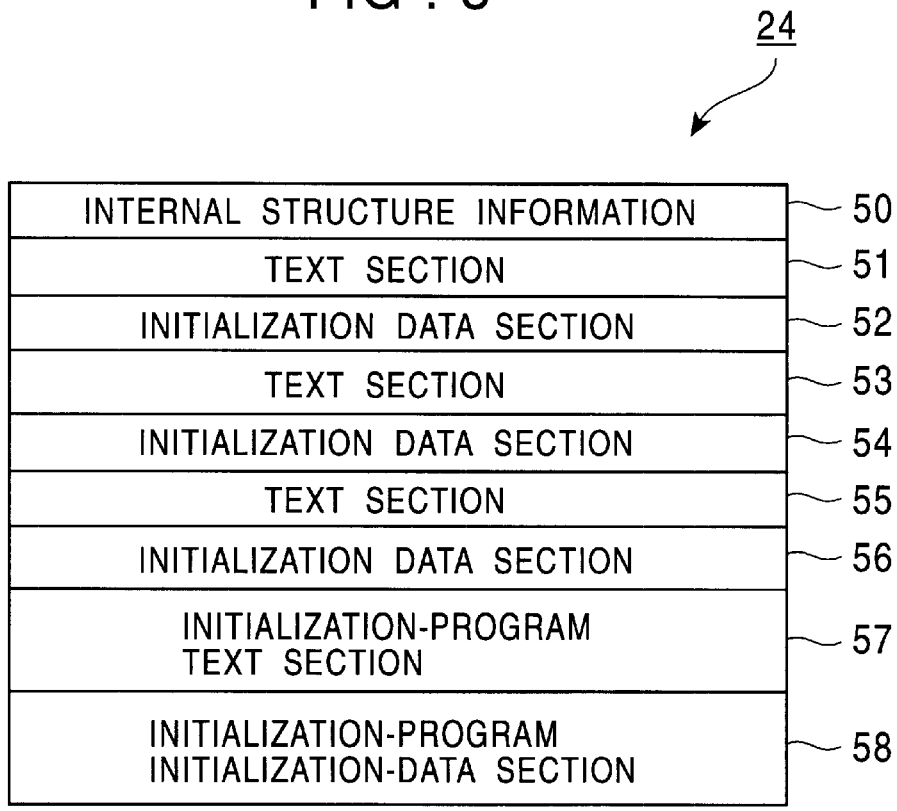
FIG. 3 illustrates the internal structure of a complex execution-format file according to the present invention.

The complex execution-format file 24 has, for example, an internal structure such as that shown in FIG. 3, and has an internal structure in which internal structure information 50, a text section 51, an initialization data section 52, a text section 53, an initialization data section 54, a text section 55, an initialization data section 56, an initialization program text section 57, and an initialization-program initialization-data section 58 are linked in sequence.

The internal structure information 50 is located at the initial portion of the complex execution-format file 24, and contains information for identifying contents which follow, information for the length thereof, etc. By analyzing this internal structure information 50, necessary information can be extracted from the portions which follow.

The text section 51, the text section 53, and the text section 55 are program codes of the execution-format file 34, the execution-format file 35, and the execution-format file 38, respectively.

The initialization data section 52, the initialization data section 54, and the initialization data section 56 are initial-value data areas for variables of the execution-format file 34, the execution-format file 35, and the execution-format file 38, respectively.

The initialization program text section 57 is a program code of the initialization program 23. This initialization program text section 57 contains a process for assigning the text sections 51, 53, and 55, and the initialization data sections 52, 54, and 56 to an appropriate memory space on the basis of the internal structure information 50.

The initialization-program initialization-data section 58 is an initial-value data area for variables of the initialization program 23.

In FIG. 3, a case is shown in which the complex execution-format file 24 controls three sets (hereinafter referred to as "modules") of a text section and an initialization data section. However, the complex execution-format file 24 according to the present invention may contain a plurality of modules in such a manner as to correspond to the number of execution-format files shown in FIG. 2.

In the complex execution-format file 24, the initialization-unnecessary-data sections contained in the execution-format files 34, 35, and 38, and the initialization program 23 shown in FIG. 2 are not contained. This makes it possible to reduce the file size of the complex execution-format file 24 by an amount corresponding to the initialization-unnecessary-data sections.

Figure 4:
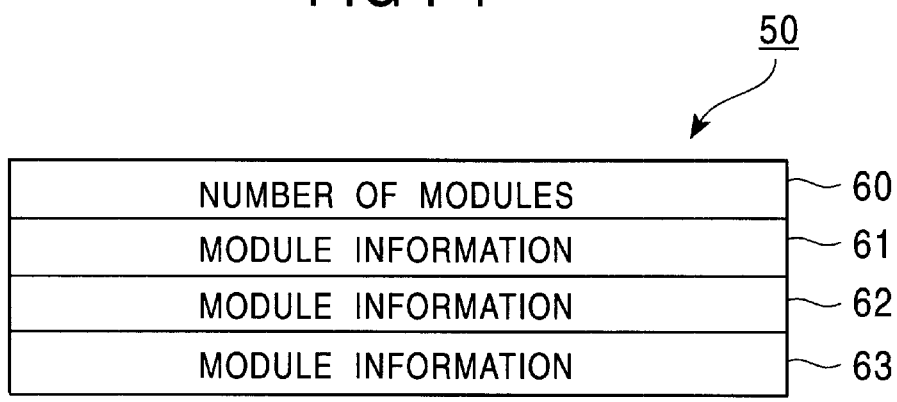
FIG. 4 illustrates the internal structure information of the complex execution-format file.

Also, the internal structure information 50 has, for example, an internal structure such as that shown in FIG. 4, and has an internal structure in which the number 60 of modules, module information 61, module information 62, and module information 63 are linked in sequence.

The number 60 of modules is the number of modules contained in the complex execution-format file 24. For example, when the complex execution-format file 24 has an internal structure shown in FIG. 1, the number 60 of modules becomes "3".

The module information 61, the module information 62, and the module information 63 maintain information for the respective modules contained in the complex execution-format file 24. That is, the module information 61, the module information 62, and the module information 63 maintain information for the text section 51 and the initialization data section 52, the text section 53 and the initialization data section 54, and the text section 55 and the initialization data section 56, respectively.

Figure 5:
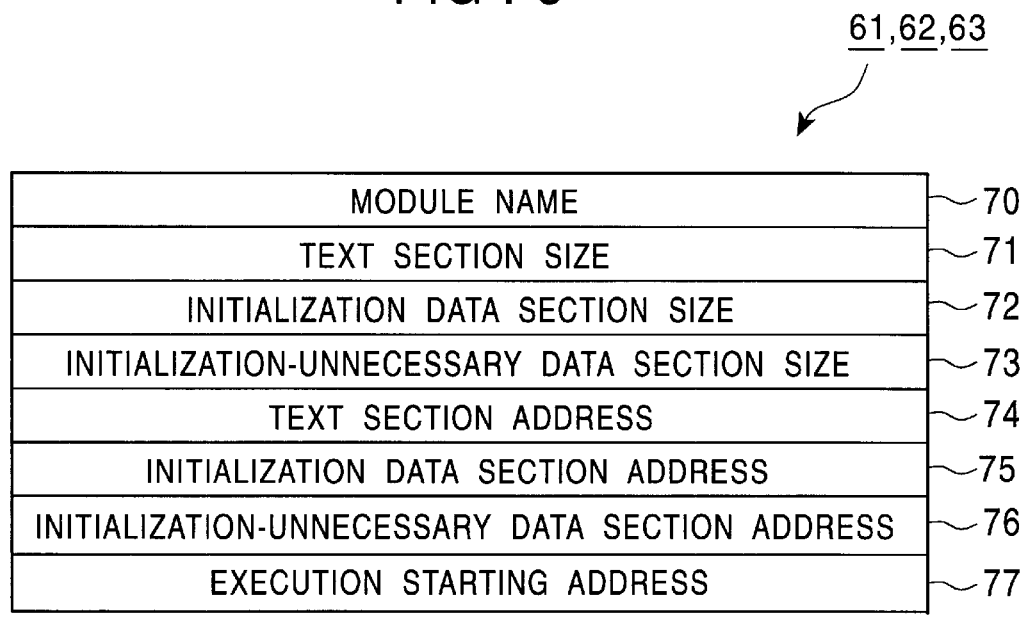
FIG. 5 illustrates module information of the internal structure information.

Each of the module information 61, 62, and 63 has an internal structure such as that shown in FIG. 5. More specifically, each module information has an internal structure in which a module name 70, a text section size 71, an initialization data section size 72, an initialization-unnecessary-data section size 73, a text section address 74, an initialization-unnecessary-data section address 75, an initialization-unnecessary-data section address 76, and an execution starting address 77 are linked in sequence.

The module name 70 is the name of each module in the complex execution-format file 24, and is used to identify each module.

The text section size 71 and the initialization data section size 72 indicate the size of the text section and that of the initialization data section of each module in the complex execution-format file 24. The initialization-unnecessary-data section size 73 indicates the size of the initialization-unnecessary-data section created in the storage device for execution for each module, as will be described later.

The text section address 74 indicates the address in a memory space in which the text section of each module in the complex execution-format file 24 should be located, and is required in a case in which the text section is linked so as to be located at specific addresses in advance. The initialization data section address 75 indicates an address in a memory space in which the initialization data section of each module in the complex execution-format file 24 should be located. The initialization-unnecessary-data section address 76 indicates the address in a memory space in which the initialization-unnecessary-data section (to be described later) should be created.

The execution starting address 77 indicates an address which should be called up first when the text section of each module in the complex execution-format file 24 is located in a memory space and is executed. That is, each text section located in the memory space starts operating as a result of the execution starting address 77 being called up.

In the internal structure information 50, the total size of the number 60 of modules and each of the module information 61, 62, and 63 becomes the size of the whole. In the software system to be installed, by reading from the address back by the size of the internal structure information 50 from the starting address of the complex execution-format file 24, the first text section 51 of this complex execution-format file 24 can be read. In a similar manner, in the software system to be installed, by reading from the address back by the total size of the internal structure information 50 and the text section 51 from the starting address of the complex execution-format file 24, the first initialization data section 52 of this complex execution-format file 24 can be read.

Figure 6:
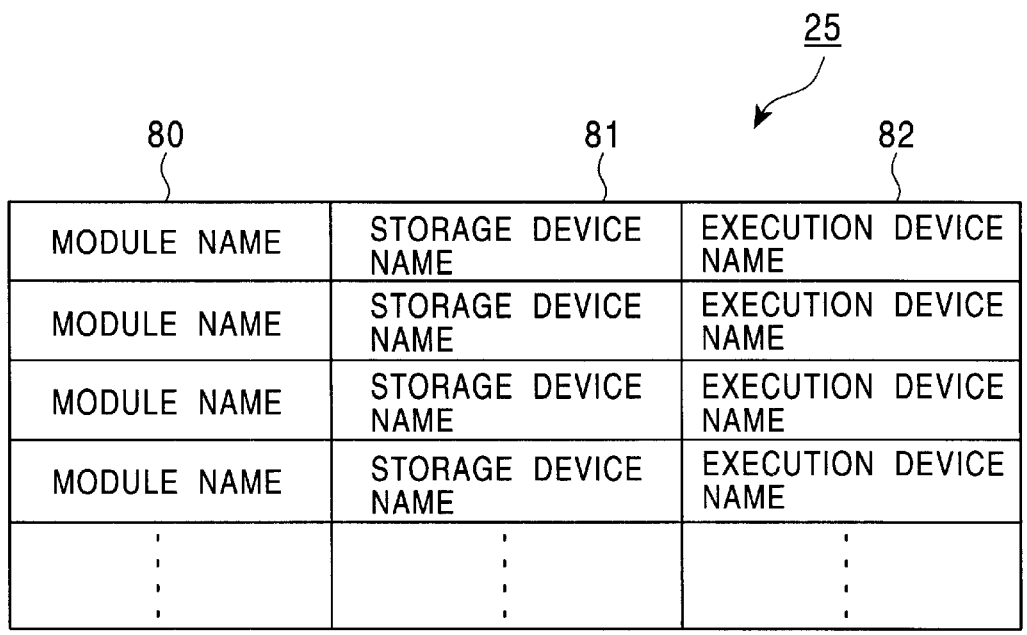
FIG. 6 illustrates ROM information according to the present invention.

Next, the ROM information 25 in FIG. 1 is described with reference to FIG. 6. The ROM information 25, as shown in FIG. 6, has information for a module name 80, a storage device name 81, and an execution device name 82 for each module contained in the complex execution-format file 24.

The module name 80 corresponds to the module name 70 in the module information 61, 62, and 63 shown in FIG. 5. The storage device name 81 is identification information which indicates the type of storage device for storage, etc., in the software system to be installed, and indicates the storage device for storage in which the module indicated by the module name 80 is installed. In a similar manner, the execution device name 82 is identification information which indicates the type of storage device for execution, etc., in the software system to be installed, and indicates a storage device for execution which executes the module indicated by the module name 80.

The ROM information 25 has the module name 80, the storage device name 81, and the execution device name 82 for each module, thereby indicating a storage device for storage in which each module is installed, and a storage device for execution to which the module is copied from this storage device for storage.

The present invention is not limited to the structure in which the storage device for storage and the storage device for execution are indicated for each module by the ROM information 25 in the above-described manner. For example, the ROM information 25 may have the storage device name and the execution device name for each of the text section and the initialization data section contained in that module of the modules indicated by the module name 80, and the initialization-unnecessary-data section created by that module. This makes it possible for the ROM information 25 to indicate the storage device for storage and the storage device for execution for each section in each module.

Figure 7:
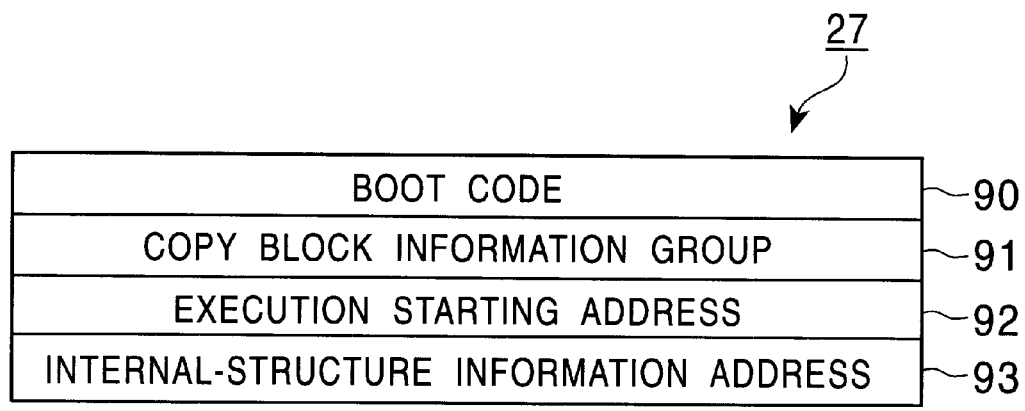
FIG. 7 illustrates the internal structure of a boot program according to the present invention.

On the other hand, the boot program 27 has, for example, an internal structure such as that shown in FIG. 7, and has an internal structure in which a boot code 90, a copy block information group 91, an execution starting address 92, and an internal-structure information address 93 are linked in sequence.

The boot code 90 is such that the boot program 26 is located in appropriate addresses in accordance with the address of the storage device for storage, starting from a predetermined address, in such a manner as to correspond to the type of processor apparatus of the target software system to be installed. The copy block information group 91 is information for copying the text sections 51, 53, and 55, and the initialization data sections 52, 54, and 56 in the complex execution-format file 24 from the storage device for storage to the storage device for execution. The execution starting address 92 is an address at which the initialization program text section 57 in the complex execution-format file 24 is executed first. The internal-structure information address 93 is a starting address of the internal structure information 50 to be passed to the initialization program text section 57.

Figure 8:
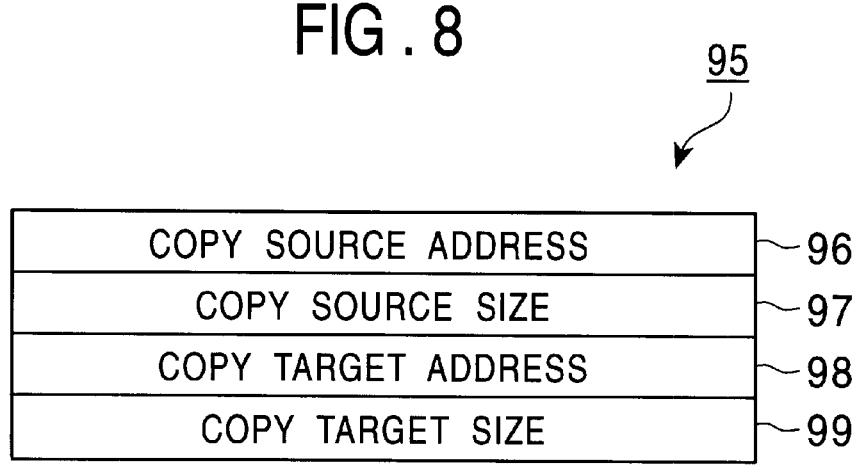
FIG. 8 illustrates copy block information of the boot program.

The copy block information group 91 has a plurality of pieces of copy block information 95 such as those shown in FIG. 8, and has an internal structure in which the respective copy block information 95 is linked in sequence. Each copy block information 95 is information for copying the text sections 51, 53, and 55, the initialization data sections 52, 54, and 56, the initialization program text section 57, and the initialization-program initialization-data section 58 in the complex execution-format file 24 from the storage device for storage to the storage device for execution.

The copy block information 95, as shown in FIG. 8, has an internal structure in which a copy source address 96, a copy source size 97, a copy target address 98, and a copy target size 99 are linked in sequence.

The copy source address 96 is a starting address at which copying of each section held in the storage device for storage is started. The copy source size 97 is the size of each section which is read from the storage device for storage. The copy target address 98 is a starting address of each section in the storage device for execution. The copy target size 99 is the size of each section in the storage device for execution.

In the copy block information 95, the copy source size 97 corresponding to the text sections 51, 53, and 55, and the initialization data sections 52, 54, and 56 matches the copy target size 99, but may differ depending on the alignment required by the target software system to be installed.

Also, in the copy block information 95, copying is not performed into the target storage device for execution; with respect to the section which is directly executed from the storage device for storage by the processor apparatus, for example, an invalid value is set in the copy source address 96, and "0" is set in the copy target address 98. This makes it possible for the copy block information 95 to indicate whether or not, as a result of the copy target address 98 being referred to, a corresponding section should be copied into the storage device for execution.

In this embodiment, for the text section 53, an invalid value is set in the copy source address 96, and "0" is set in the copy target address 98. As a result, the text section 53 is directly executed from the storage device for storage by the processor apparatus.

Figure 9:
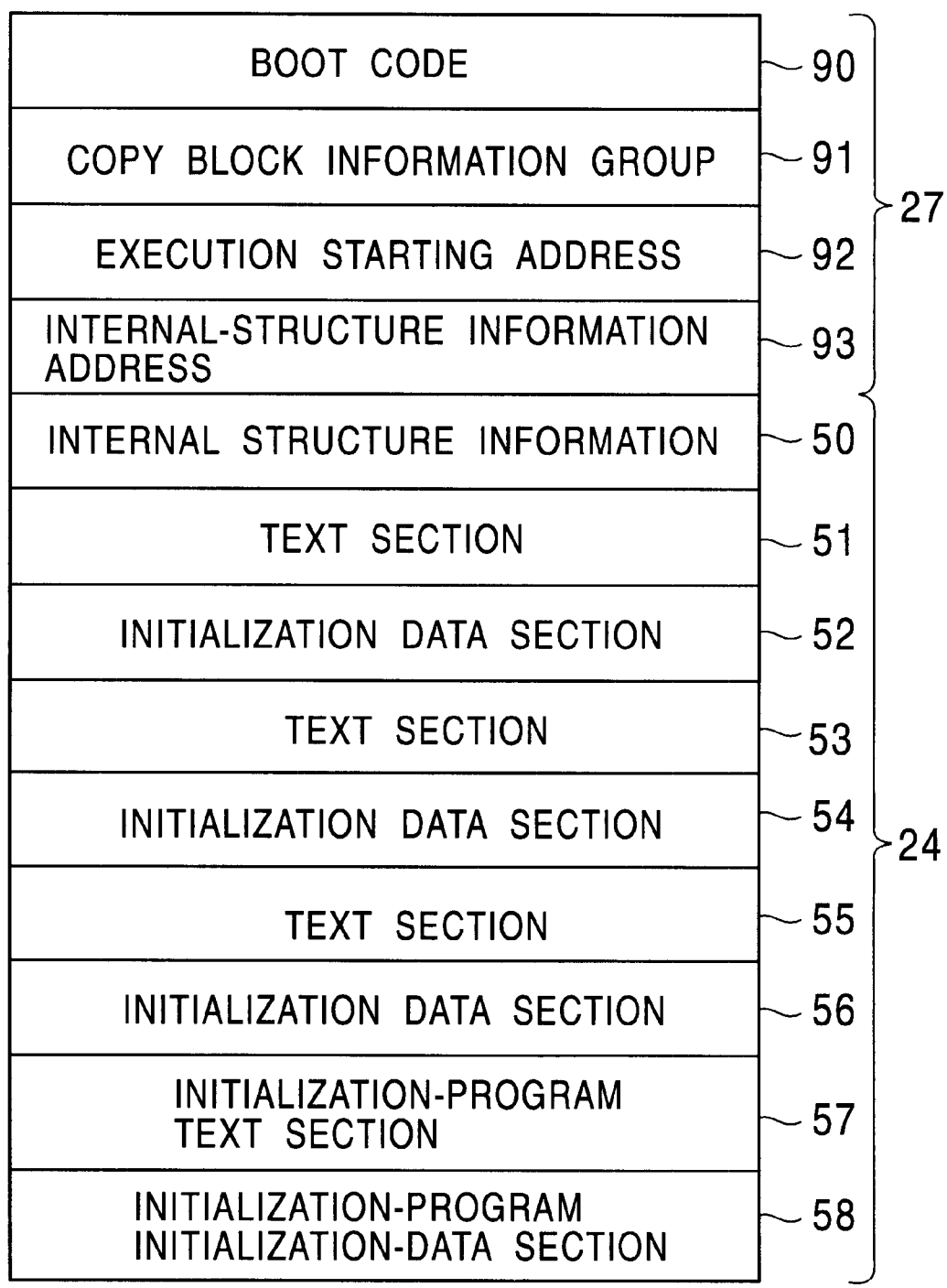
FIG. 9 illustrates the state of an execution program on a storage device for storage according to the present invention.

Next, an internal structure in which the complex execution-format file 24 and the boot program 27 are linked and are written as an execution program in the storage device for storage is shown in FIG. 9. In a state in which the execution program is written into the storage device for storage, the execution program has an internal structure in which the complex execution-format file 24 and the boot program 27 are linked in sequence. The execution program is located on this storage device for storage so that the start of the boot code 90 of the boot program 27 overlaps the starting address of the storage device for storage, starting from a specific address corresponding to the type of processor apparatus of the target software system to be installed.

Next, an example of the internal structure in which the execution program written into the storage device for storage is copied into the storage device for execution by the processor apparatus in accordance with the boot program 27 in this execution program is shown in FIG. 10.

The execution program copied into the storage device for execution, as shown in FIG. 10, has an internal structure in which a text section 100, an initialization data section 101, an initialization-unnecessary-data section 102, an initialization data section 103, an initialization-unnecessary-data section 104, a text section 105, an initialization data section 106, an initialization-unnecessary-data section 107, a work area 108, an initialization program text section 109, an initialization-program initialization-data section 110, and an initialization-program initialization-unnecessary-data section 111 are linked in sequence.

In FIG. 10, the text section 100, the initialization data section 101, the initialization data section 103, the text section 105, the initialization data section 106, the initialization program text section 109, and the initialization-program initialization-data section 110 are such that the text section 51, the initialization data section 52, the initialization data section 54, the text section 55, the initialization data section 56, the initialization program text section 57, and the initialization-program initialization-data section 58 in the execution program shown in FIG. 9 are copied into the storage device for execution, respectively.

In FIG. 10, the text section 53 in the execution program written into the storage device for storage is not copied into the target storage device, and the text section 53 is executed directly from this storage device for storage by the processor apparatus. However, each section in the execution program may be directly executed from the storage device for storage by setting an invalid value or "0" in the copy source address 96 or the copy target address 98 of the copy block information 95 in the above-described manner, or each section may be copied into the storage device for execution and be executed from this storage device for execution.

Initialization-unnecessary-data sections 102, 104, and 107, and the initialization-program initialization-unnecessary-data section 111 are created, by the processor apparatus of the software system to be installed, in accordance with the initialization-unnecessary-data section size 73 in the internal structure information 50 for each module which is referred to by the boot program 27.

The work area 108 is a memory space allocated in the target storage device for execution, so that the processor apparatus uses it when executing each section.

As is clear from a comparison between FIGS. 9 and 10, the boot program 27 in the execution program is not copied, and is directly executed from the storage device for storage by the processor apparatus. Also, since the internal structure information 50 in the execution program is read only, it is not copied and is directly referred to in the storage device for storage by the processor apparatus.

Next, a method for starting the execution program written into the storage device for storage in the above-described manner is described with reference to FIG. 11.

In step S120, the starting of the execution program is begun.

In step S121, the processor apparatus reads the boot code 90 in the storage device for storage, starting from a specific address, and executes it.

In step S122, the processor apparatus initializes hardware, such as various types of storage devices, input/output devices, etc., of the software development system in accordance with the program code in the boot code 90.

In step S123, the processor apparatus refers to the copy block information group 91 in accordance with the program code in the boot code 90, and copies the text sections 51 and 55, the initialization data sections 52, 54, and 56, the initialization program text section 57, and the initialization-program initialization-data section 58 from the storage device for storage into the target storage device for execution.

In step S124, the processor apparatus refers to the copy block information group 91 in accordance with the program code in the boot code 90, and creates the initialization-unnecessary-data sections 102, 104, and 107 and the initialization-program initialization-unnecessary-data section 111 in the target storage device for execution.

In step S125, the processor apparatus refers to the execution starting address 92, and starts the execution of the initialization program text section 109 copied into the target storage device for execution.

In step S126, the processor apparatus refers to the internal structure information 50 in the storage device for storage, the initialization-unnecessary-data section 102 copied onto target storage device, the initialization-program initialization data section 110 copied into the target storage device, and the initialization-program initialization-unnecessary-data section 111 created in the target storage device for execution in accordance with the program code in the initialization program text section 109, initializes the text section 53 in the storage device for storage, the text sections 100 and 105 in the storage device for execution, etc., by using the work area 108, and creates interrelated information. This step S126 is not within the range of the present invention, and accordingly, a detailed description thereof is omitted.

In step S127, the processor apparatus executes the program codes in each text section while accessing each data section.

In step S128, the operation of the execution program is terminated.

Figure 12:
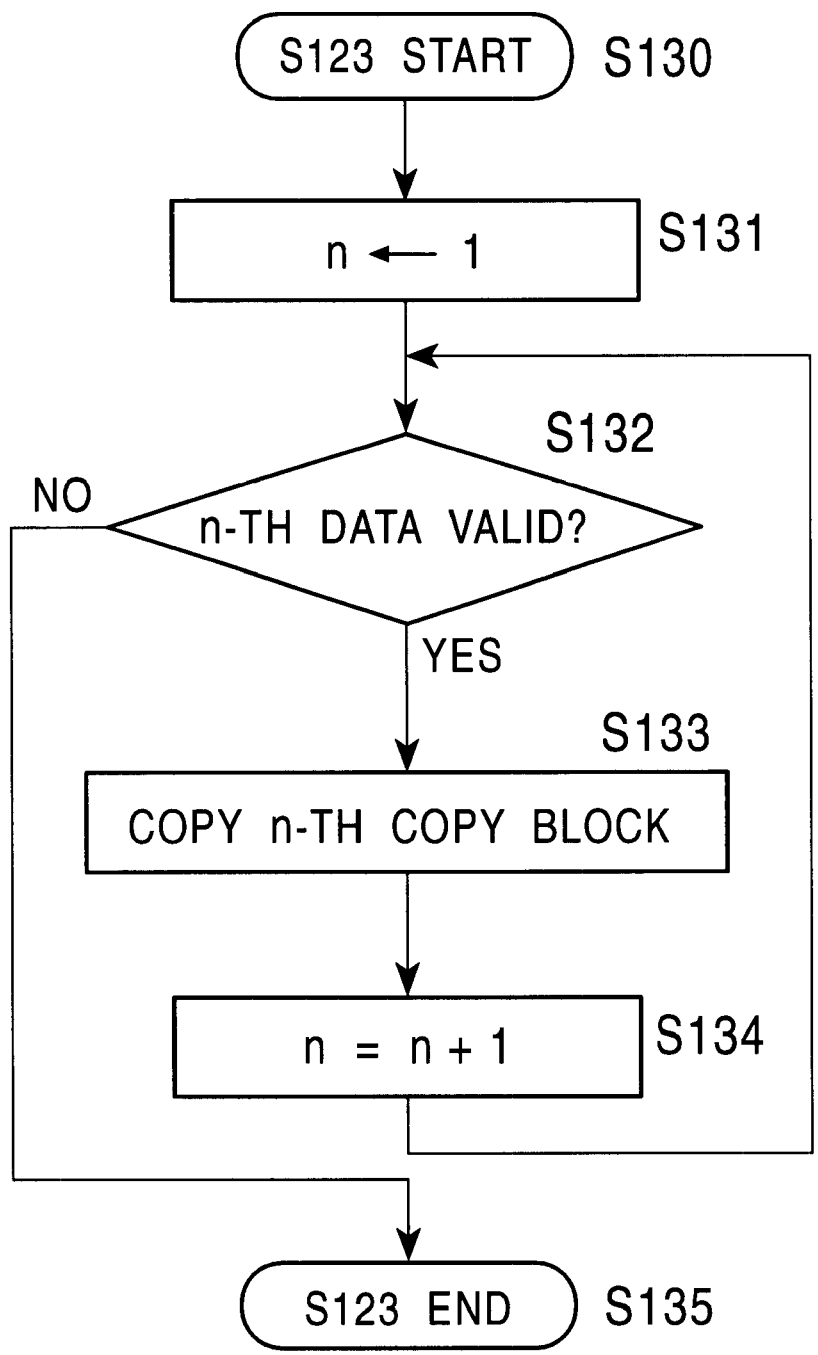
FIG. 12 is a block diagram illustrating step S123 in FIG. 11.

Next, an example of a specific operation in the above-described step S123 is described with reference to FIG. 12.

In step S130, the processor apparatus starts the process of step S123.

In step S131, the processor apparatus initializes to "1" a value n indicating that the n-th copy block information 95 which exists in the copy block information group 91 within the execution program in the storage device for storage is to be processed.

In step S132, the processor apparatus refers to the n-th copy block information 95 in order to determine whether or not valid information has been set. When valid information has been set, the processor apparatus makes the process proceed to the subsequent step S133. At this time, when it is determined that the n-th copy block information 95 is invalid information, for example, when an invalid value has been set in the copy source size 97 or when "0" has been set in the copy target address 98, the processor apparatus makes the process proceed to step S135 to be described later.

In step S133, the processor apparatus copies each section, such as the text section, the initialization data section, etc., contained in the execution program in the storage device for storage, into the execution storage device in accordance with the n-th copy block information 95 referred to in step S132.

In step S134, the processor apparatus increments the value n by 1 and makes the process proceed to step S132, whereby, the processor apparatus next performs a process on the (n+1)-th copy block information 95.

Figure 11:
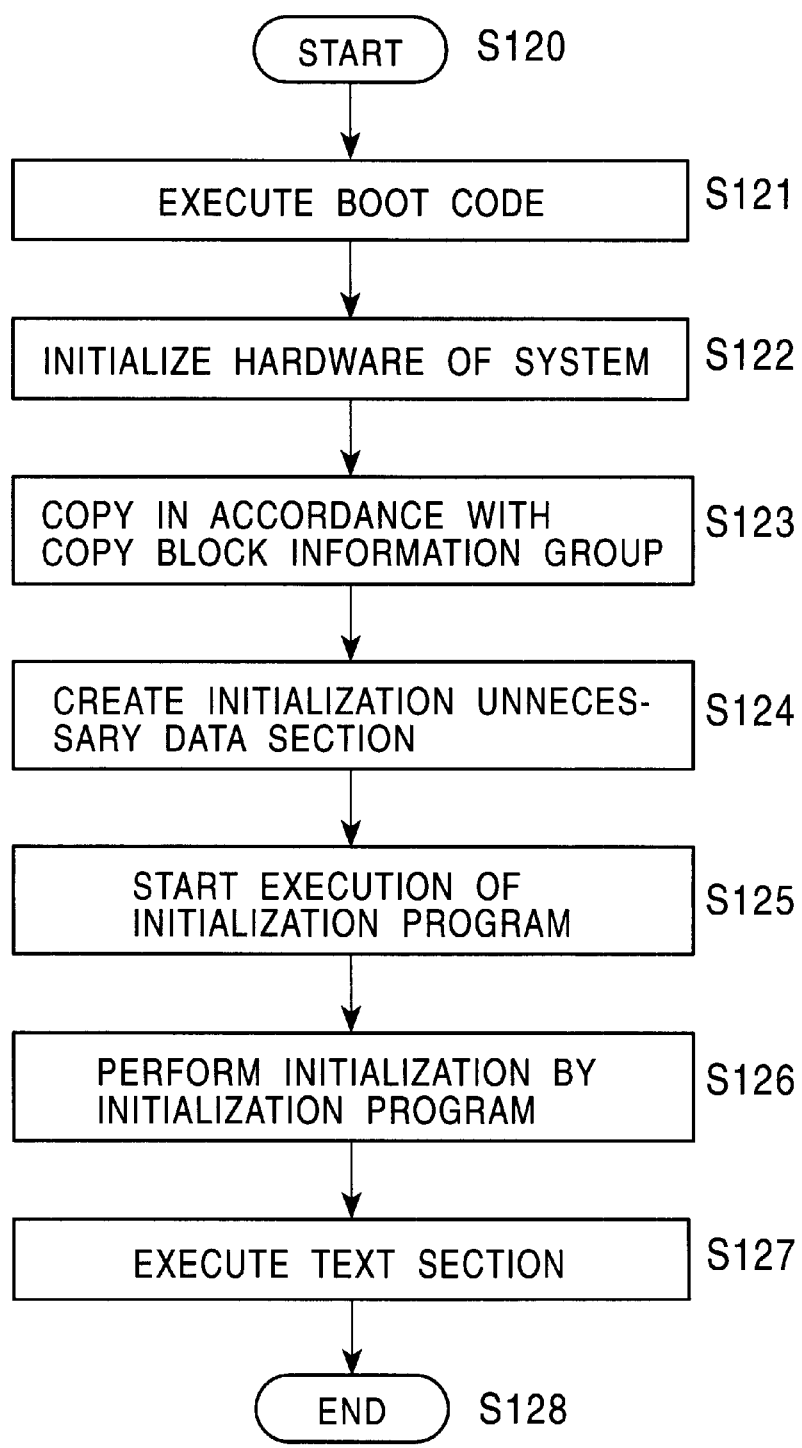
FIG. 11 is a block diagram illustrating a method for starting an execution program according to the present invention.

In step S135, the processor apparatus terminates the process of step S123 in FIG. 11.

In this step S123, it is necessary to be informed that the process of the last copy block information 95 has been completed. For this purpose, for example, copy block information 95 having an invalid value at the last of the copy block information group 91 in the execution program is provided, so that the process may reliably proceed from step S132 to step S135. Alternatively, for example, a value m indicating the number of copy block information 95 may be set at the start of the copy block information group 91 in the execution program, so that when n>m is reached in step S132, the process proceeds to step S135.

Next, a specific construction of the complex execution-format file creation section 22 shown in FIG. 1 is described. In the following, first, an example of the construction of the complex execution-format file creation section 22 is described with reference to FIG. 13.

Figure 13:
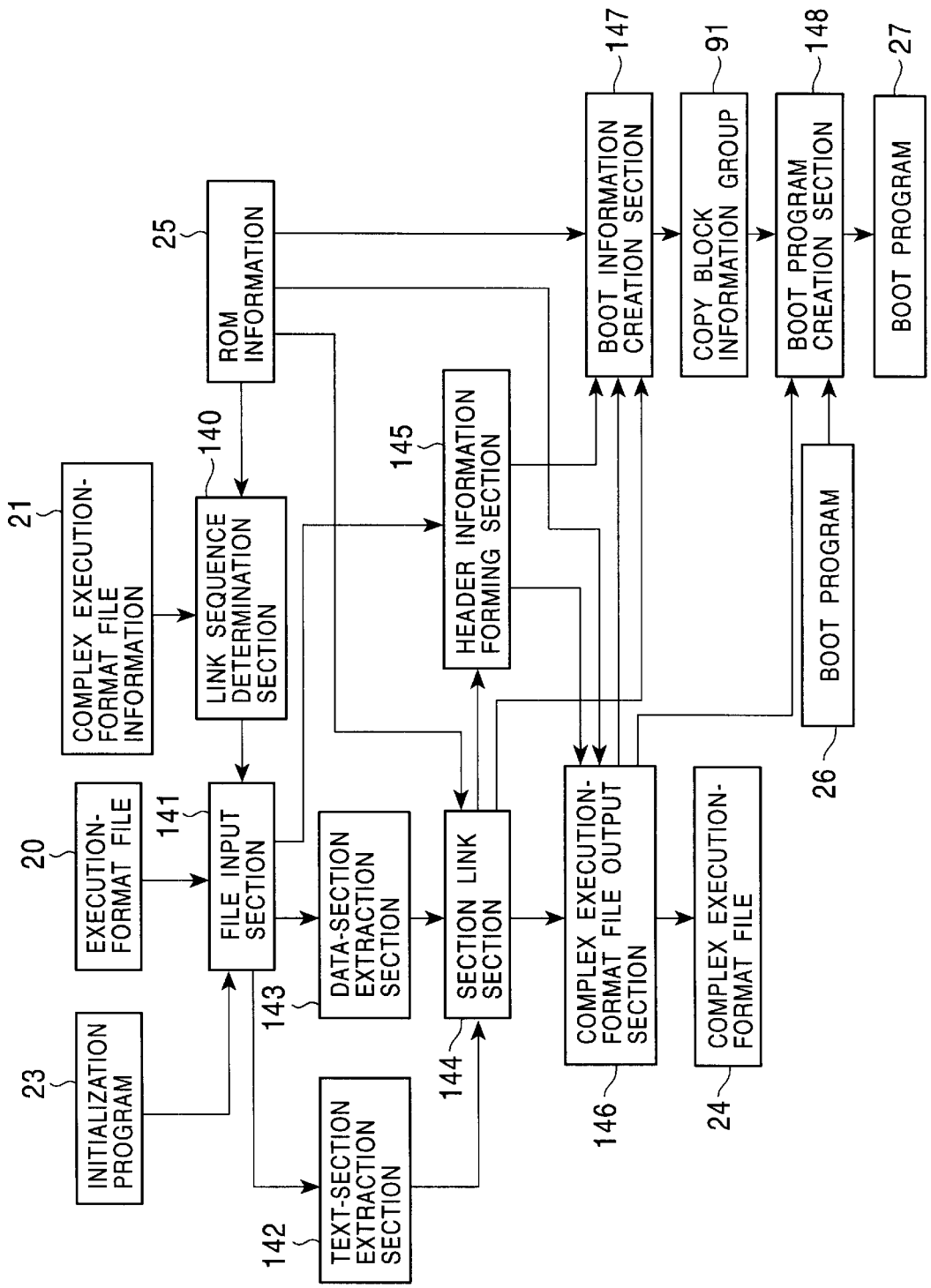
FIG. 13 is a block diagram illustrating an example of the construction of a complex execution-format file creation section according to the present invention.

The complex execution-format file creation section 22, as shown in FIG. 13, comprises a link sequence determination section 140, a file input section 141, a text-section extraction section 142, a data-section extraction section 143, a section link section 144, a header information forming section 145, a complex execution-format file output section 146, a boot information creation section 147, and a boot program creation section 148.

The link sequence determination section 140 selects the execution-format file 20 used for the link in accordance with the complex execution-format file information 21. Also, the link sequence determination section 140 determines the link sequence of the plurality of selected execution-format files 20 in accordance with the ROM information 25. At this time, the link sequence determination section 140 determines the link sequence so that the modules classified by the same execution device name 82 in the ROM information 25 can be located consecutively within the storage device for storage.

The file input section 141 reads a plurality of execution-format files 20 and the initialization program 23 in accordance with the link sequence determined by the link sequence determination section 140.

The text-section extraction section 142 receives the plurality of execution-format files 20 and the initialization program 23 from the file input section 141, and extracts a text section from the plurality of execution-format files 20 and the initialization program 23, respectively.

In a similar manner, the data-section extraction section 143 receives a plurality of execution-format files 20 and the initialization program 23 from the file input section 141, and extracts an initialization data section from the plurality of execution-format files 20 and the initialization program 23, respectively.

The section link section 144 links, for each module, the text sections and the initialization data sections which are each extracted by the text-section extraction section 142 and the data-section extraction section 143. At this time, the section link section 144 relocates each module at the address in the storage device for storage in accordance with the execution device name 82, etc., obtained from the ROM information 25. At this time, the section link section 144 relocates each module so that the addresses in the storage device for storage do not overlap each other.

The header information forming section 145 creates information which eventually becomes the internal structure information 50 in the complex execution-format file 24 in accordance with the information of each section extracted by the text-section extraction section 142 and the data-section extraction section 143. Also, the header information forming section obtains, from the section link section 144, the address in the storage device for storage at which the text section and the initialization data section of each module are located, and adds the address to the information which becomes the internal structure information 50. This makes it possible for the complex execution-format file 24 which is eventually created to indicate the address at which each module is positioned in the storage device for storage, and the address when each module is copied from the storage device for storage to the storage device for execution by referring to the internal structure information 50.

The complex execution-format file output section 146 links each section linked by the section link section 144 with the internal structure information 50 created by the header information forming section 145, and outputs it as a complex execution-format file 24. At this time, the complex execution-format file output section 146 outputs the complex execution-format file 24 in the optimum form in such a manner as to correspond to a storage device for storage to which the complex execution-format file 24 is eventually written as an execution program in accordance with the storage device name 81 obtained from the ROM information 25. Specifically, for example, the complex execution-format file 24 may be output in what is commonly called a "Motorola S record form", an "Intel hexa form", etc., in addition to a binary form.

The boot information creation section 147 obtains the execution address of each module and the size thereof at the time of execution from the ROM information 25 and the section link section 144 and obtains the module name of each module from the header information forming section 145, and creates information which eventually becomes the copy block information group 91 of the boot program 27 in accordance with the obtained information.

More specifically, the boot information creation section 147 retrieves the ROM information 25 in accordance with the module name obtained from the header information forming section 145, and determines that this module must be copied when the storage device name 81 and the execution device name 82 for the module name 80 matching this module name differ from each other. Then, the boot information creation section 147 uses the storage address and the storage size of the module obtained from the complex execution-format file output section 146, and the execution address of the module and the size thereof at the time of execution obtained from the section link section 144 as the copy source address 96, the copy source size 97, the copy target address 98, and the copy target size 99, respectively, in order to create copy block information 95 corresponding to this module. The boot information creation section 147 links the copy block information 95 created for each module in order to create the copy block information group 91.

When the storage device name 81 and the execution device name 82 of the ROM information 25 corresponding to the module name obtained from the header information forming section 145 are the same, the boot information creation section 147 determines that this module need not be copied. Then, with respect to the copy block information 95 for this module, an invalid value is input to the copy source size 97, and "0" is input to the copy target address 98.

The boot program creation section 148 relocates the boot program 26 to the address which is read first from the storage device for storage by the processor apparatus when the execution program is booted, forming the boot code 90, and it is linked with the copy block information group 91 created by the boot information creation section 147, creating the boot program 27. Also, the boot program creation section 148 detects an initialization program from the module name obtained from the header information forming section 145, and adds the execution starting address of this initialization program, as the execution starting address 92, to the boot program 27. Also, the boot program creation section 148 obtains the address at which the internal structure information 50 of the complex execution-format file 24 is located, from the complex execution-format file output section 146, and adds it, as the internal-structure information address 93, to the boot program 27.

Figure 14:
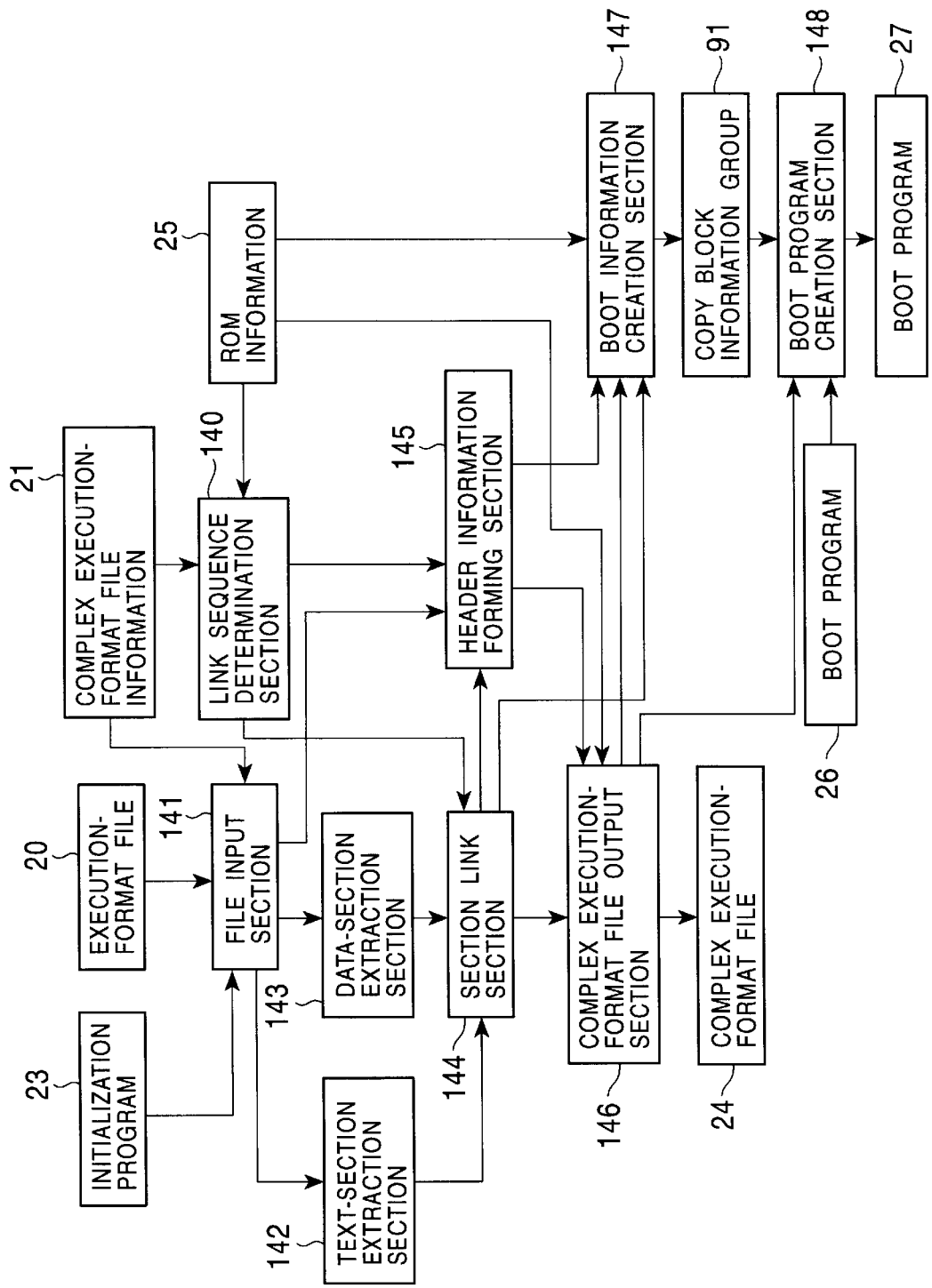
FIG. 14 is a block diagram illustrating another example of the construction of the complex execution-format file creation section according to the present invention.

Next, a case in which the complex execution-format file creation section 22 is formed into a construction such as that shown in FIG. 14 is described with reference to this FIG. 14. In the following description, descriptions which are the same as or correspond to those portions in the case in which the construction shown in FIG. 13 is formed as described above are omitted, and in FIG. 14, the same reference numerals as those in FIG. 13 are given.

The complex execution-format file creation section 22 in this case does not use the link sequence information determined by the link sequence determination section 140 in the file input section 141, and uses it in the header information forming section 145 and the section link section 144.

The file input section 141 reads a plurality of execution-format files 20 and the initialization program 23 in accordance with the complex execution-format file information 21. The text-section extraction section 142 receives the plurality of execution-format files 20 and the initialization program 23 from the file input section 141, extracts a text section by analyzing information for the respective internal structures, and stores it. Also, in a similar manner, the data-section extraction section 143 receives a plurality of execution-format files 20 and the initialization program 23 from the file input section 141, extracts an initialization data section by analyzing information for the respective internal structures, and stores it.

The text-section extraction section 142, the data-section extraction section 143, and the header information forming section 145 obtain information of each section corresponding to the plurality of execution-format files 20 and the initialization program 23 and information for the internal structures of the plurality of execution-format files 20 and the initialization program 23 from the file input section 141, and stores them, respectively.

The section link section 144 obtains the link sequence information from the link sequence determination section 140, and links each section output from the text-section extraction section 142 and the data-section extraction section 143 in accordance with this link sequence information.

The header information forming section 145 receives information for each internal structure of the plurality of execution-format files 20 from the file input section 141, and creates the internal structure information 50 in accordance with the link sequence information obtained from the link sequence determination section 140.

Next, a software development apparatus for providing the software development system shown in FIG. 1 is described.

Figure 15:
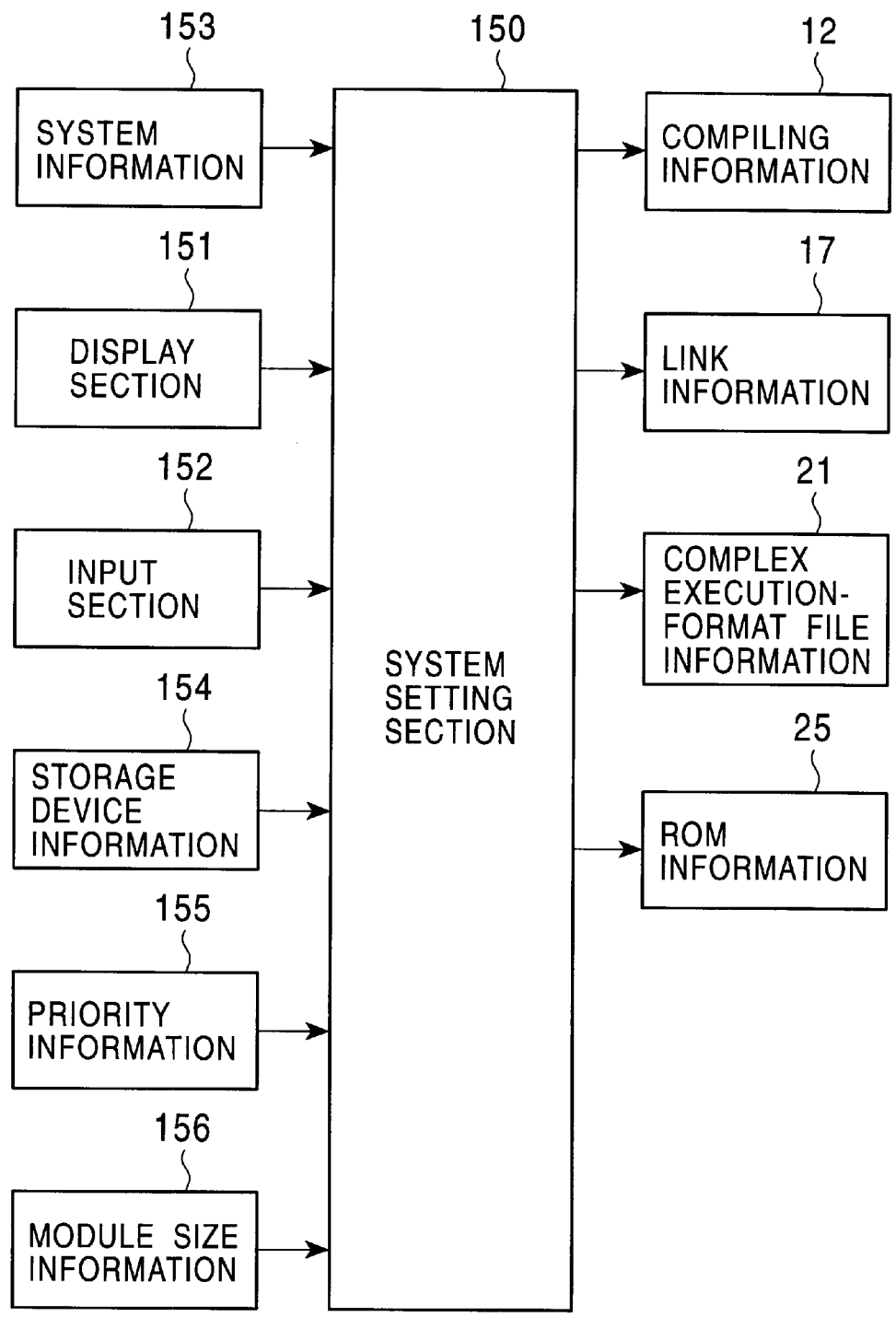
FIG. 15 is a block diagram showing a software development apparatus according to the present invention.

The software development apparatus, as shown in FIG. 15, comprises a system setting section 150 for performing various input/output operations, an input section 152 for providing various instructions to this system setting section 150, and a display section 151 for displaying various information output from this system setting section 150. Also, for the system setting section 150, system information 153, storage device information 154, priority information 155, and module size information 156 are prepared, and these are used in this system setting section 150.

The software development apparatus is an apparatus for outputting the compiling information 12, the link information 17, the complex execution-format file information 21, and the ROM information 25, which are used in the software development system shown in FIG. 1 in accordance with an instruction input by the user on the basis of the system information 153, the storage device information 154, the priority information 155, and the module size information 156.

The display section 151 is, for example, various types of display devices, printer devices, etc., and has a function for displaying, for a user, a variety of information output from the system setting section 150. The input section 152 is, for example, a keyboard, a mouse, a tablet, etc., and has a function for inputting various types of instructions from the user to the system setting section 150.

The system information 153 maintains information for hardware which can be made a target by this software development apparatus, and information for software, such as the compatible compiler 1, linker 18, etc.

The storage device information 154 maintains information for various types of storage devices which exist in the target software system to be installed. The storage device information 154, for example, as shown in FIG. 16, is composed of a storage device name 160, an address 161, and a size 162. The storage device name 160 is an identification name of each storage device used in the software system to be installed. The address 161 is the starting address in the memory space of the storage device indicated by the storage device name 160. The size 162 is the size of the memory space of the storage device indicated by the storage device name 160.

The storage device information 154 has a plurality of the storage device name 160, the address 161, and the size 162 in such a manner as to correspond to the number of storage devices used in the software system to be installed.

Also, the storage device information 154, as shown in FIG. 17, may be composed of, in addition to the above-mentioned storage device name 160, the address 161, and the size 162, nonvolatile-property information 163, writability information 164, access speed 165, etc. The nonvolatile-property information 163 indicates whether or not memory can be maintained when electrical power is not supplied to the storage device indicated by the storage device name 160. The writability information 164 indicates whether or not the storage device indicated by the storage device name 160 is capable of writing. The access speed 165 indicates the access speed of the storage device indicated by the storage device name 160.

Figure 18:
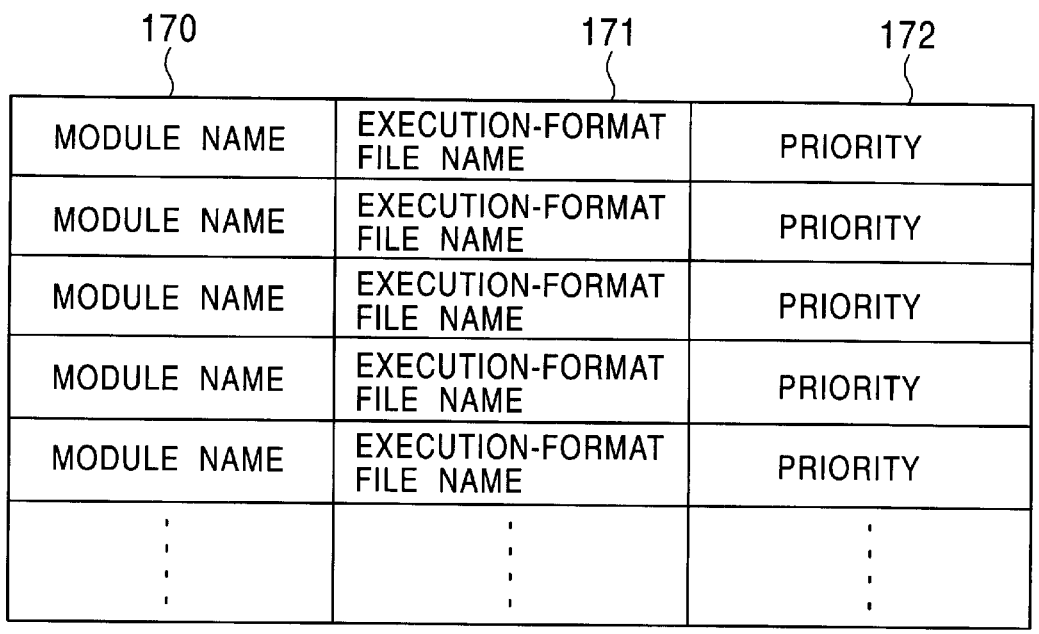
FIG. 18 illustrates priority information of the software development apparatus.

The priority information 155 maintains information for the storage device assigned to each execution-format file 20 in the software development system shown in FIG. 1. The priority information 155, for example, as shown in FIG. 18, is composed of a module name 170, an execution-format file name 171, and a priority 172. The module name 170 corresponds to the module name contained in the internal structure information of the execution-format file 20, and is an identification name of the module contained in each execution-format file 20. The execution-format file name 171 is the file name of the execution-format file 20 containing a module indicated by the module name 170. The priority 172 is a priority at which the module indicated by the module name 170 should be operated in the software system to be installed.

The priority information 155 has a plurality of the above-mentioned module name 170, the execution-format file name 171, and the priority 172 at least in such a manner as to correspond to the number of modules incorporated into the software system to be installed.

The module size information 156 maintains the sizes of the text section, the initialization data section, the initialization-unnecessary-data section, etc., of each execution-format file 20. There are cases in which this module size information 156 is changed by calculating the size of each section of each execution-format file 20 by the complex execution-format file creation section 22 in the software development system shown in FIG. 1.

The module size information 156, specifically, for example, as shown in FIG. 19, is composed of a module name 180, a text size 181, an initialization data size 182, and an initialization-unnecessary-data size 183. The module name 180 corresponds to the module name contained in the internal structure information of the execution-format file 20, and is an identification name of the module contained in each execution-format file 20. The text size 181, the initialization data size 182, and the initialization-unnecessary-data size 183 are the sizes of the text section, the initialization data section, and the initialization-unnecessary-data section of the execution-format file 20 containing the module indicated by the module name 180, respectively.

The module size information 156 indicates what size of memory capacity is required by the module indicated by the module name 180. That is, when the module indicated by the module name 180 is directly executed in the storage device for storage by the processor apparatus, a memory capacity for an amount such that the text size 181, the initialization data size 182, and the initialization-unnecessary-data size 183 are totaled is required in the storage device for storage. Also, when this module is copied into the storage device for execution and is executed, in addition to the memory capacity in the storage device for storage, a memory capacity for an amount such that the initialization data size 182 and the initialization-unnecessary-data size 183 are totaled is required in the storage device for execution. Furthermore, when this module is to be executed at a higher speed, in addition to the above-described amount, a memory capacity for an amount such that the text size 181 is totaled is required in the storage device for execution to which the module is copied.

The module size information 156 has a plurality of the above-mentioned module name 180, the text size 181, the initialization data size 182, and the initialization-unnecessary-data size 183 at least in such a manner as to correspond to the number of modules to be incorporated in the software system to be installed.

Each of the above-mentioned system information 153, the storage device information 154, the priority information 155, and the module size information 156 may be information provided in advance in the software development apparatus, for example, may be information input, in a file form, etc., from an external source via various types of storage media.

The system setting section 150 reads the system information 153 and displays the information for this software development apparatus on the display section 151 in accordance with this system information 153. Also, the system setting section 150 obtains an instruction from the user based on the information displayed on the display section 151 via the input section 152.

Also, in a similar manner, the system setting section 150 reads the storage device information 154, the priority information 155, and the module size information 156, displays these various types of information on the display section 151, and obtains an instruction from the user based on the displayed information via the input section 152.

Figure 20:
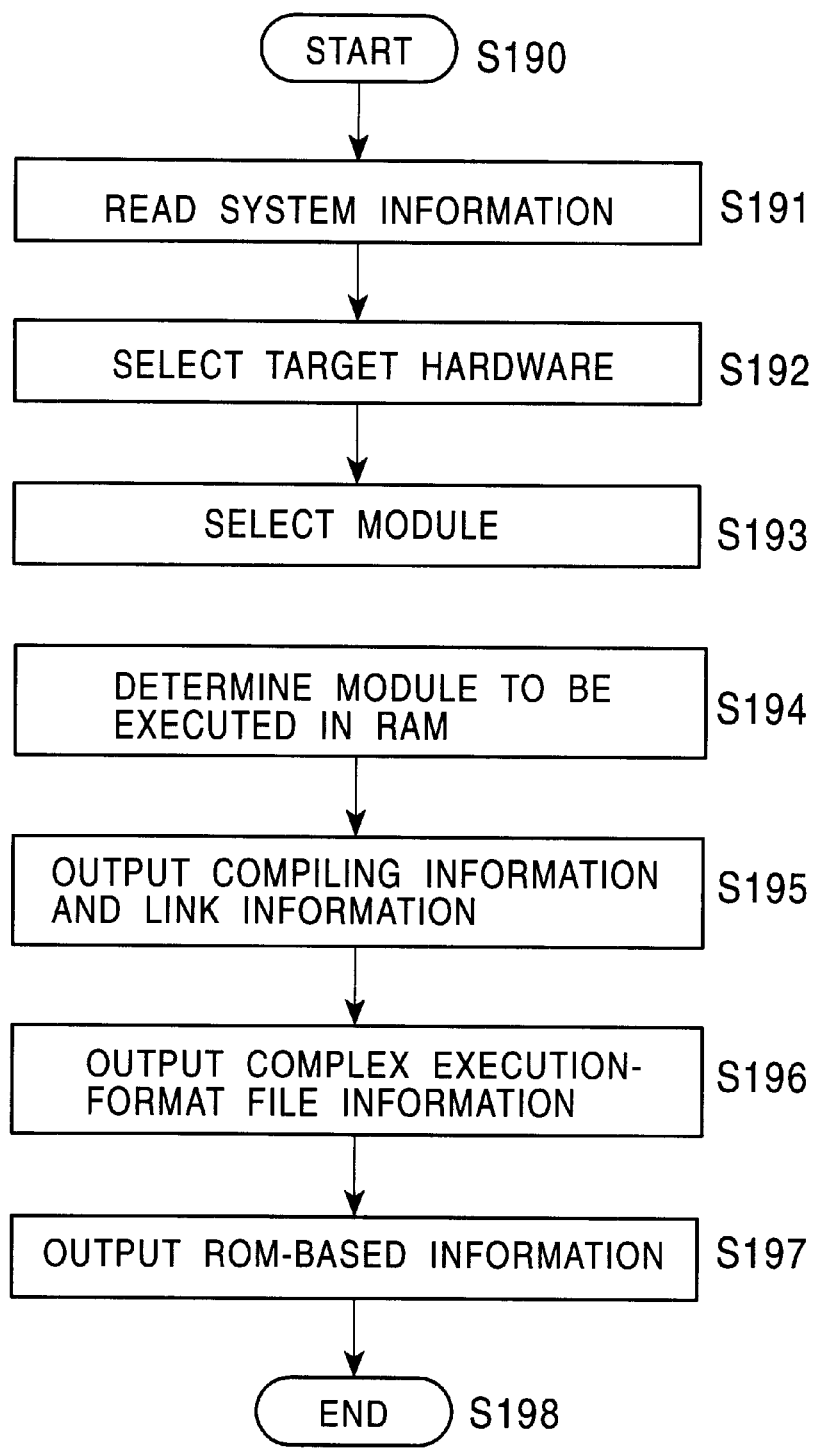
FIG. 20 is a block diagram illustrating a system setting procedure in the software development apparatus.

Next, an example of the system setting procedure in software development using the above-described software development apparatus is described with reference to FIG. 20.

In step S190, the software development apparatus is activated, and the software development procedure is started.

In step S191, the system setting section 150 reads the system information 153.

In step S192, the system setting section 150 obtains information for hardware of the supported software system to be installed by referring to the system information 153. When a plurality of software systems to be installed are supported, the system setting section 150 displays the choices of the target software system to be installed on the display section 151. At this time, the user selects the choices displayed on the display section 151 by using the input section 152.

In step S193, the system setting section 150 obtains information for each module by referring to the system information 153. The system setting section 150 displays the choices of the selectable modules on the display section 151. At this time, the user selects the choices displayed on the display section 151 by using the input section 152 in a manner similar to that in step S192. The system setting section 150 determines the storage device for storage of the module selected by the user by referring to the storage device information 154 and the module size information 156, and displays the determination result on the display section 151. The user confirms the displayed result, and makes a correction by using the input section 152, if necessary.

In step S194, the system setting section 150 determines the storage device for execution of each selected module in accordance with the storage device information 154, the priority information 155, and the module size information 156, and displays the result on the display section 151. The user confirms the displayed result and makes a correction by using the input section 152, if necessary, in a manner similar to that in step S193. The details of this step S194 will be described later.

In step S195, the system setting section 150 outputs the compiling information 12 and the link information 17 on the basis of the selection result by the user in step S192.

In step S196, the system setting section 150 outputs the complex execution-format file information 21 on the basis of the selection result by the user in step S193.

In step S197, the system setting section 150 outputs the ROM information 25 on the basis of the selection result by the user in step S194.

In step S198, the system setting section 150 stops the operation, terminating the system setting procedure.

Figure 21:
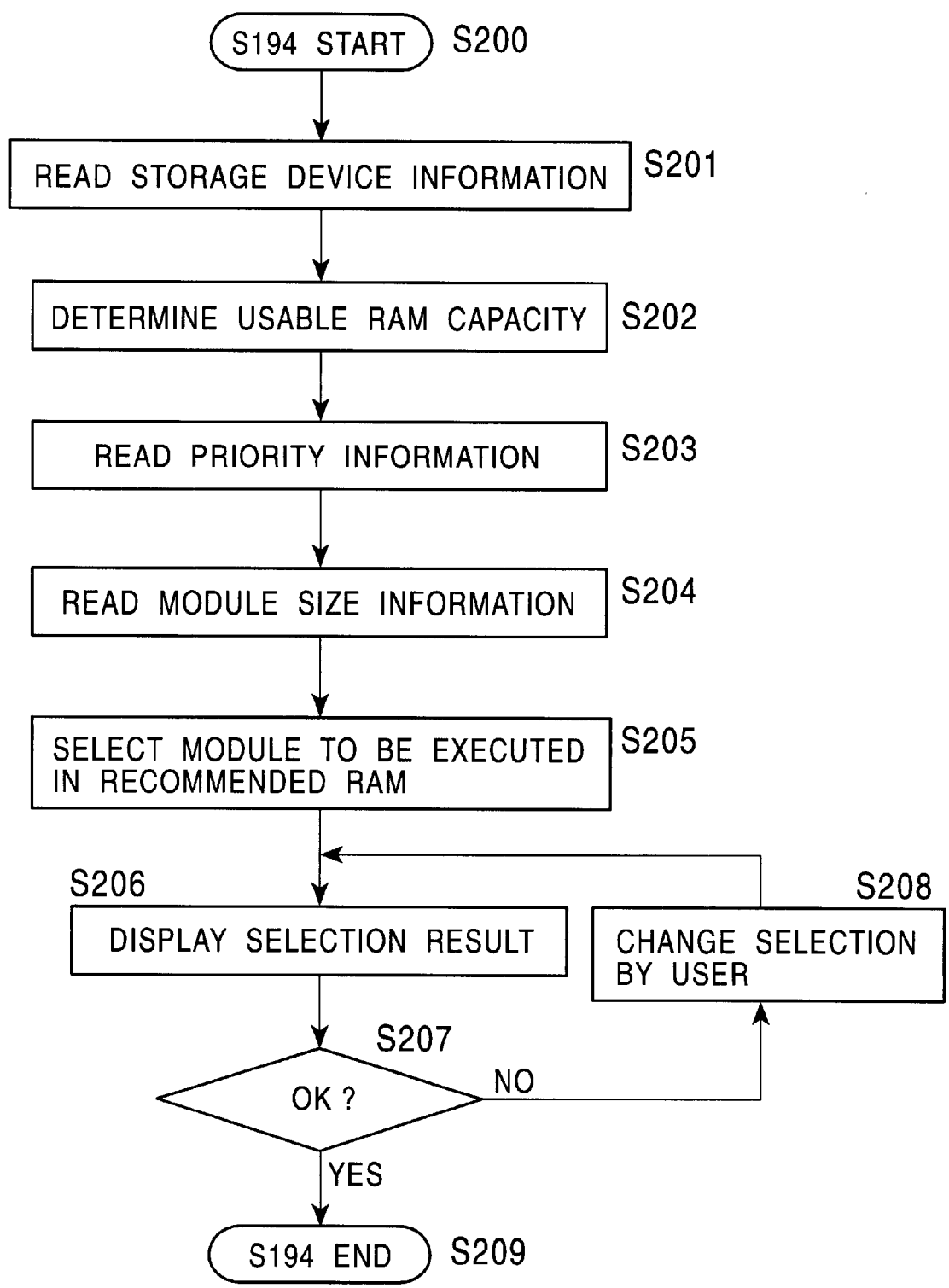
FIG. 21 is a block diagram illustrating an example of step S194 in FIG. 20.

In the following, step S194 described above is described in detail with reference to FIG. 21.

In step S200, the system setting section 150 starts step S194 described above.

In step S201, the system setting section 150 reads the storage device information 154.

In step S202, the system setting section 150 obtains the amount of memory space which can be used by each storage device from the size 162 by referring to the storage device information 154.

In step S203, the system setting section 150 reads the priority information 155.

In step S204, the system setting section 150 reads the module size information 156.

In step S205, the system setting section 150 selects a module which has a size fitting the memory capacity of the storage device for execution having a high-speed execution environment, for example, such as a RAM, and which can be executed on this storage device for execution on the basis of the priority information 155 and the module size information 156. The details of this step S205 will be described later.

In step S206, the system setting section 150 displays the result selected in step S205 described above on the display section 151.

In step S207, the system setting section 150 waits for an input from the user with respect to the display result. Then, when the user does not satisfy the display result and a request for making a selection again is input from the input section 152, the system setting section 150 makes the process proceed to step S208. Also, when an acknowledgement for the display result is input from the input section 152 by the user, the process is made to proceed to step S209.

In step S208, the system setting section 150 changes the module which is executed in the storage device for execution in accordance with the instruction from the user, and makes the process proceed to step S206.

In step S209. the system setting section 150 terminates the process of step S194, and makes the process proceed to step S195 described above.

In this step S194, the module for which a selection for execution in the storage device for execution having a high-speed execution environment is not made by the user is directly executed on this storage device for storage by the processor apparatus without being copied into the storage device for execution and written in the storage device for storage, for example, such as a ROM.

In the description of step S194 described above, waiting for an instruction from the user is done in step S207. However, for example, the module which is determined to be executed in the storage device for execution may be such that the module cannot be changed by the user. This makes it possible to reduce the input operations of the user.

Figure 22:
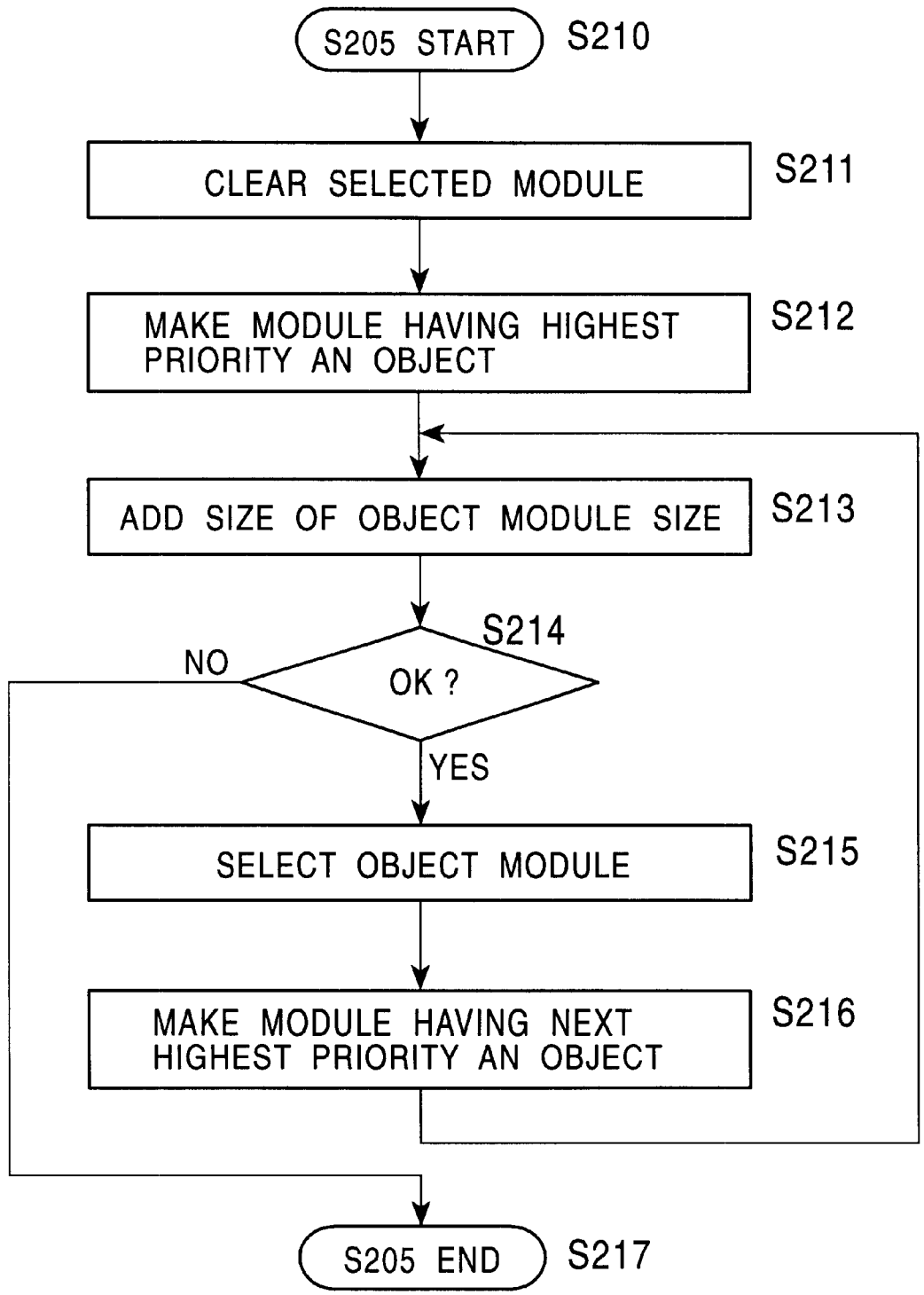
FIG. 22 is a block diagram illustrating step S205 in FIG. 21.

In the following, step S205 described above is described in detail with reference to FIG. 22.

In step S210, the system setting section 150 starts the process of step S205.

In step S211, the system setting section 150 clears the selected state of the module which is to be executed in the storage device for execution.

In step S212, the system setting section 150 makes the module having the highest priority among the priorities 172 in the priority information 155 a candidate for the module which is to be executed in this storage device for execution.

In step S213, the system setting section 150 adds together the text size 181, the initialization data size 182, the initialization-unnecessary-data size 183, etc., of the module which is made a candidate in step S212 by referring to the module size information 156 in order to determine the memory capacity which is required at the time of execution in the storage device for execution.

In step S214, the system setting section 150 compares the memory capacity, required at the time of execution, determined in step S213 with the size 162 in the storage device information 154 in order to determine whether or not the module for the candidate fits this storage device for execution. When it is determined that it fits therein, the system setting section 150 makes the process proceed to step S215. When it is determined that it does not fit therein, the system setting section 150 makes the process proceed to step S217.

In step S215, the system setting section 150 selects the module for the candidate as a module to be executed in the storage device for execution.

In step S216, the system setting section 150 makes a module having the next highest priority a candidate, and makes the process proceed to step S213.

In step S217, the system setting section 150 terminates the process of step S205, and makes the process proceed to step S206 described above.

Next, another example of step S194 described above is described in detail with reference to FIG. 23.

In step S220, the system setting section 150 starts the process of step S194.

In step S221, the system setting section 150 reads the priority information 155.

In step S222, the system setting section 150 selects a module to be executed in the storage device for execution on the basis of the priority information 155.

In step S223, the system setting section 150 displays the result selected in step S222 on the display section 151.

In step S224, the system setting section 150 waits for an input from the user with respect to the display result. Then, when the user does not satisfy the display result and a request for making a selection again is input from the input section 152, the system setting section 150 makes the process proceed to step S226. Also, when an acknowledgement for the display result is input from the input section 152 by the user, the system setting section 150 makes the process proceed to step S226.

In step S225, the system setting section 150 changes the module to be executed in the storage device for execution and makes the process proceed to step S223 in accordance with an instruction by the user.

In step S226, the system setting section 150 terminates the process of step S194 and makes the process proceed to step S195 described above.

In this step S194, the module for which a selection for execution in the storage device for execution is not made by the user is directly executed in this storage device for storage by the processor apparatus without being copied into the storage device for execution and written in the storage device for storage.

Although in the description of step S194 described above, an instruction from the user is awaited in step S224, it is possible that, for example, the module which is determined to be executed in the storage device for execution cannot be changed by the user. This makes it possible to reduce the input operations of the user.

Figure 23:
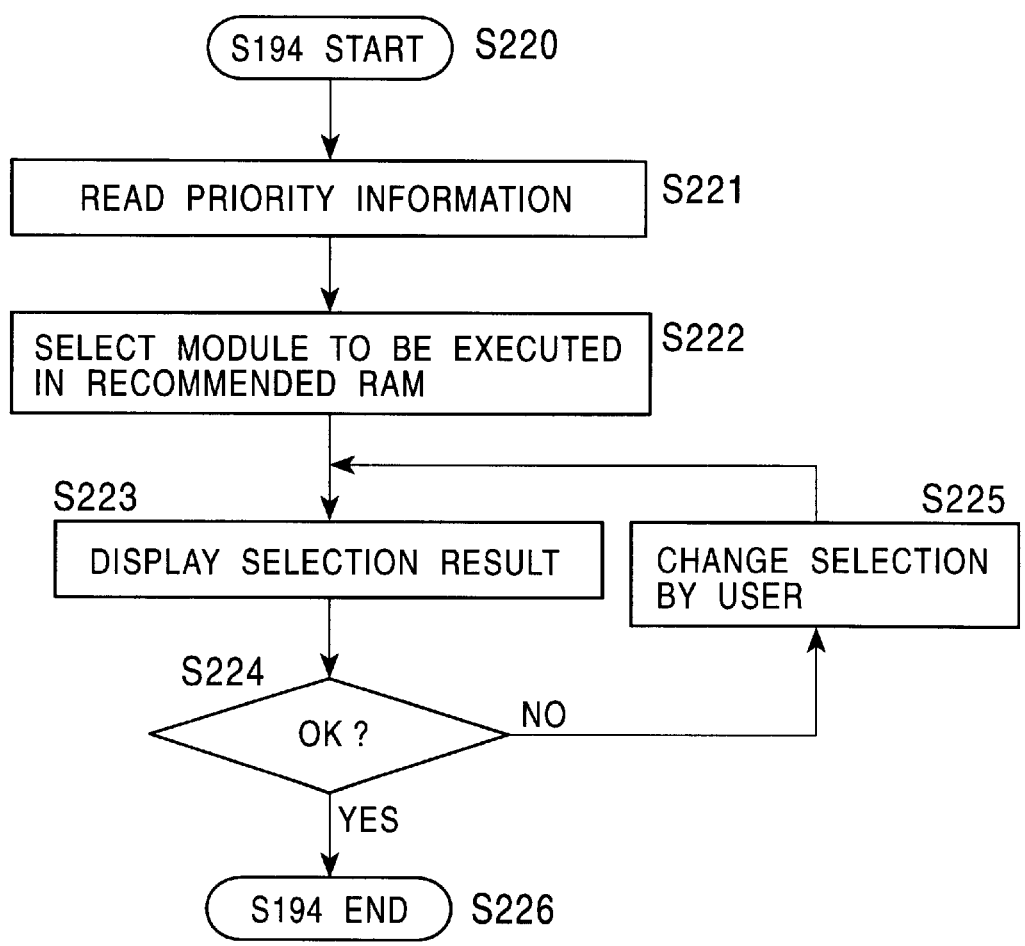
FIG. 23 is a block diagram illustrating another example of step S194 in FIG. 20.

In the procedure shown in FIG. 23, since the memory capacity in the storage device for execution for each module is not taken into consideration, the complex execution-format file 24 which is eventually created is not always executed without any problems. However, according to this procedure, even when the software development apparatus does not include the module size information 156, it is possible to select the module which is to be executed in the storage device for execution only on the basis of the priority information 155.

Figure 24:
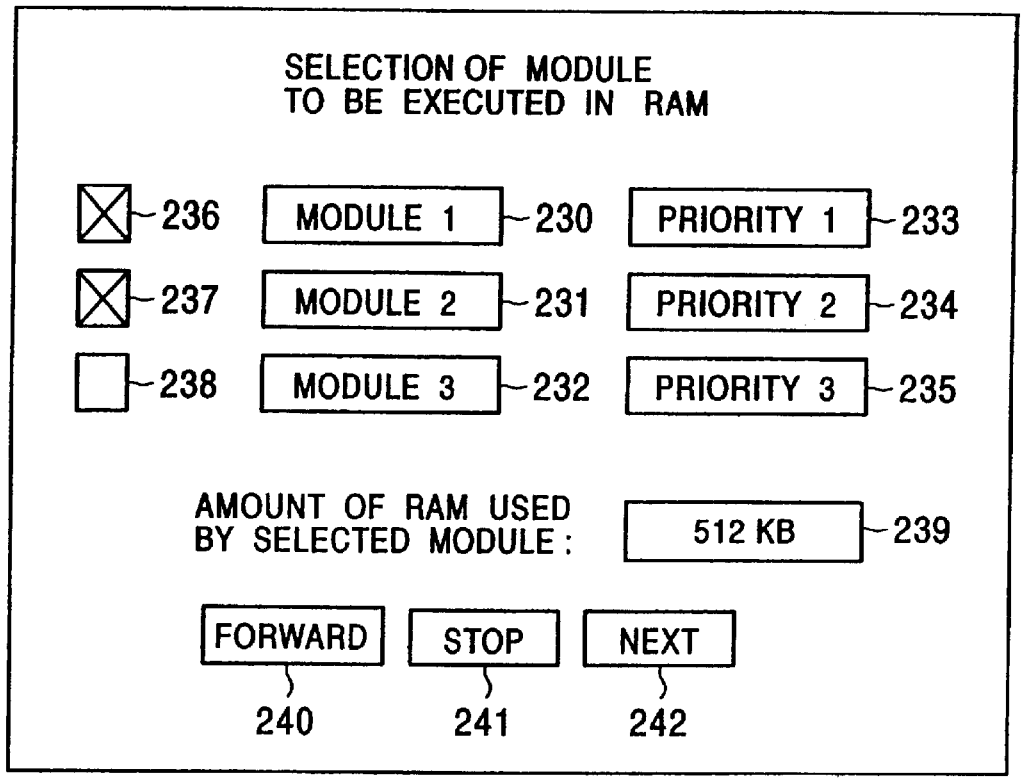
FIG. 24 shows an example of a display of the software development apparatus according to the present invention.
Figure 25:
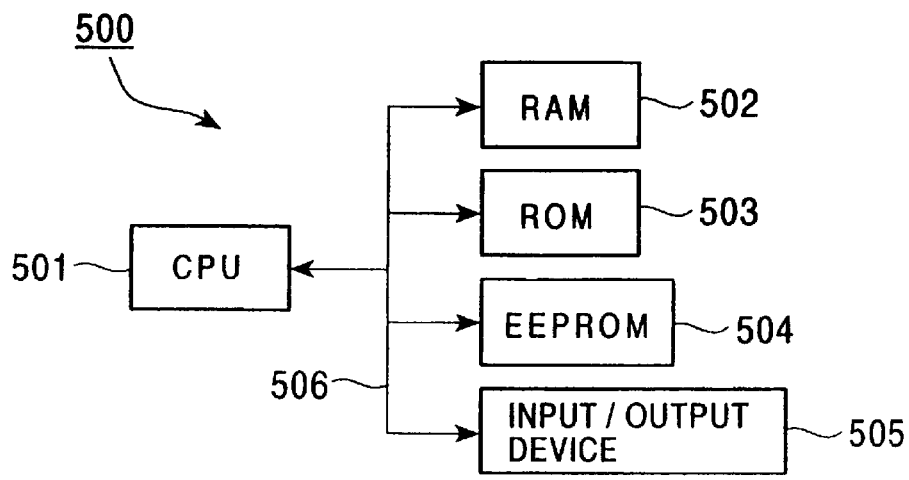
FIG. 25 is a block diagram showing an electronic apparatus for a software system to be installed.
Figure 26:
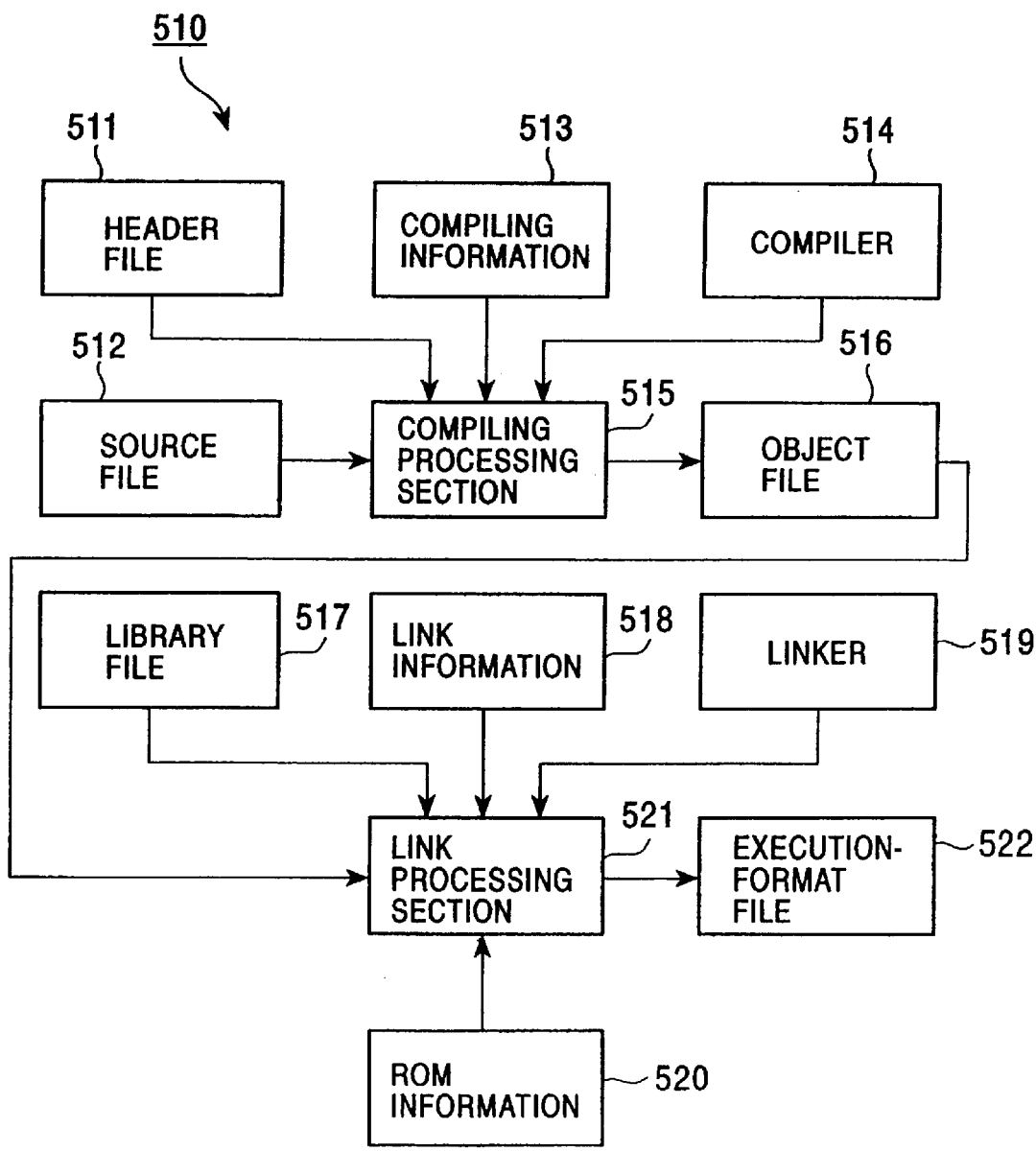
FIG. 26 is a block diagram showing a conventional software development system.
Figure 27:
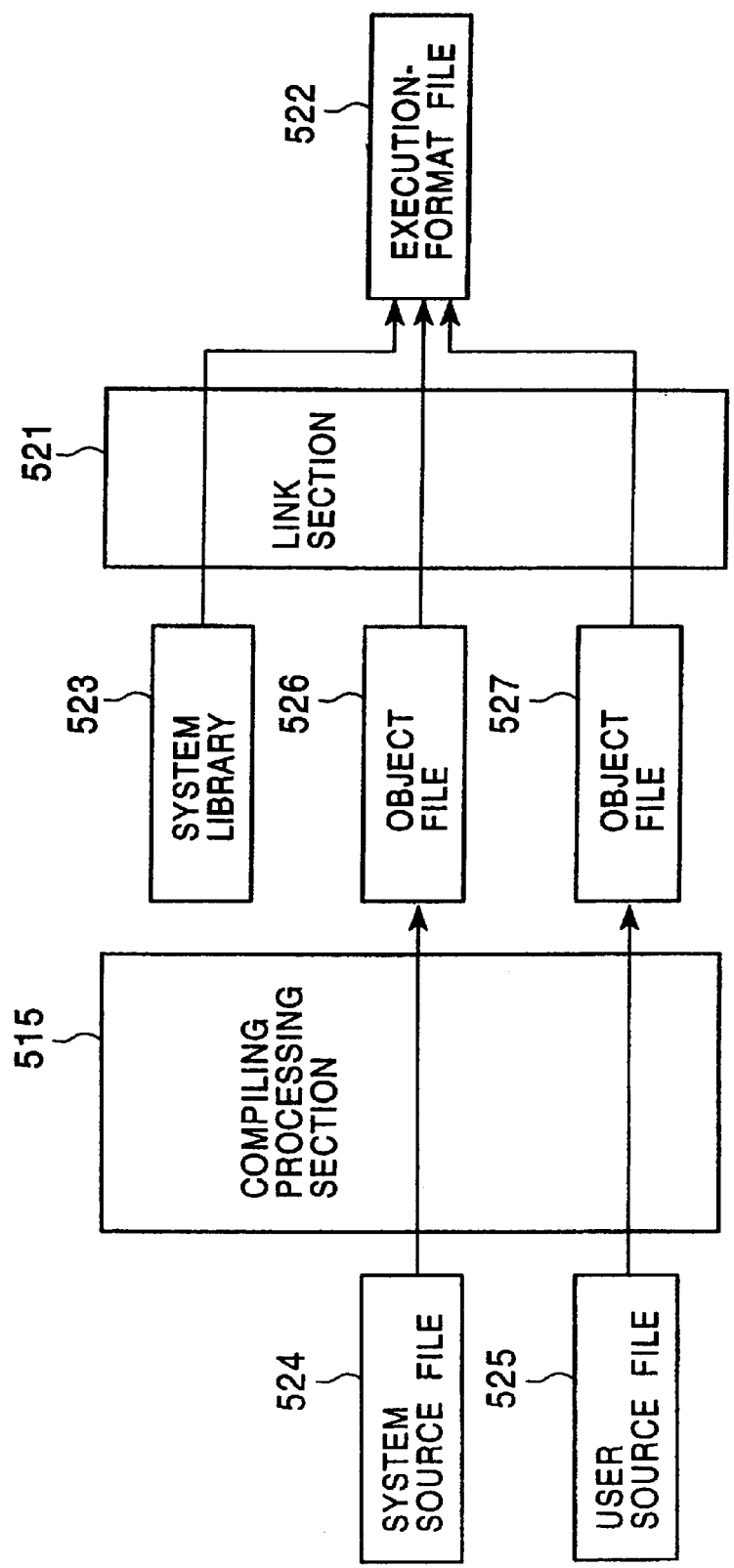
FIG. 27 is a block diagram illustrating an example of a conventional software development procedure.
Figure 28:
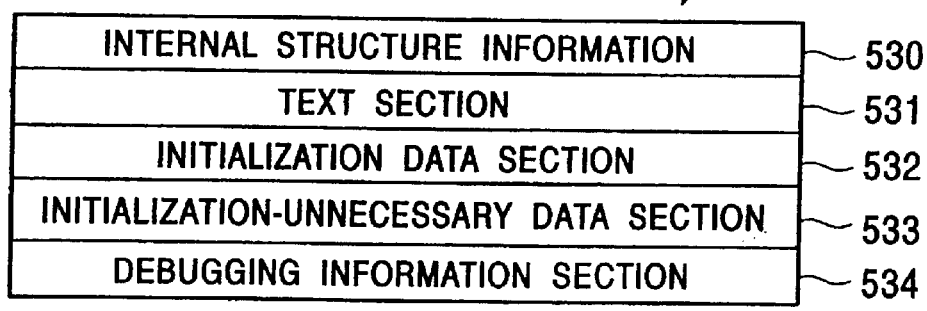
FIG. 28 illustrates a conventional execution-format file.
Figure 29:
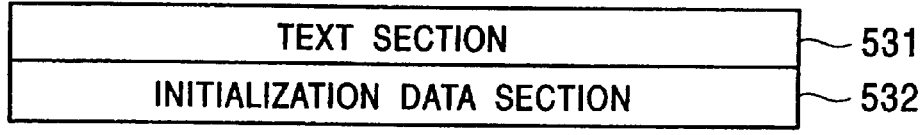
FIG. 29 illustrates the state of a conventional execution program on a ROM.
Figure 30:
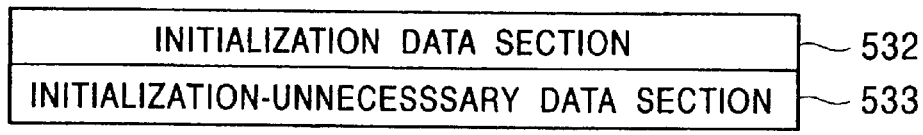
FIG. 30 illustrates the state of a conventional execution program in a RAM.
Figure 31:
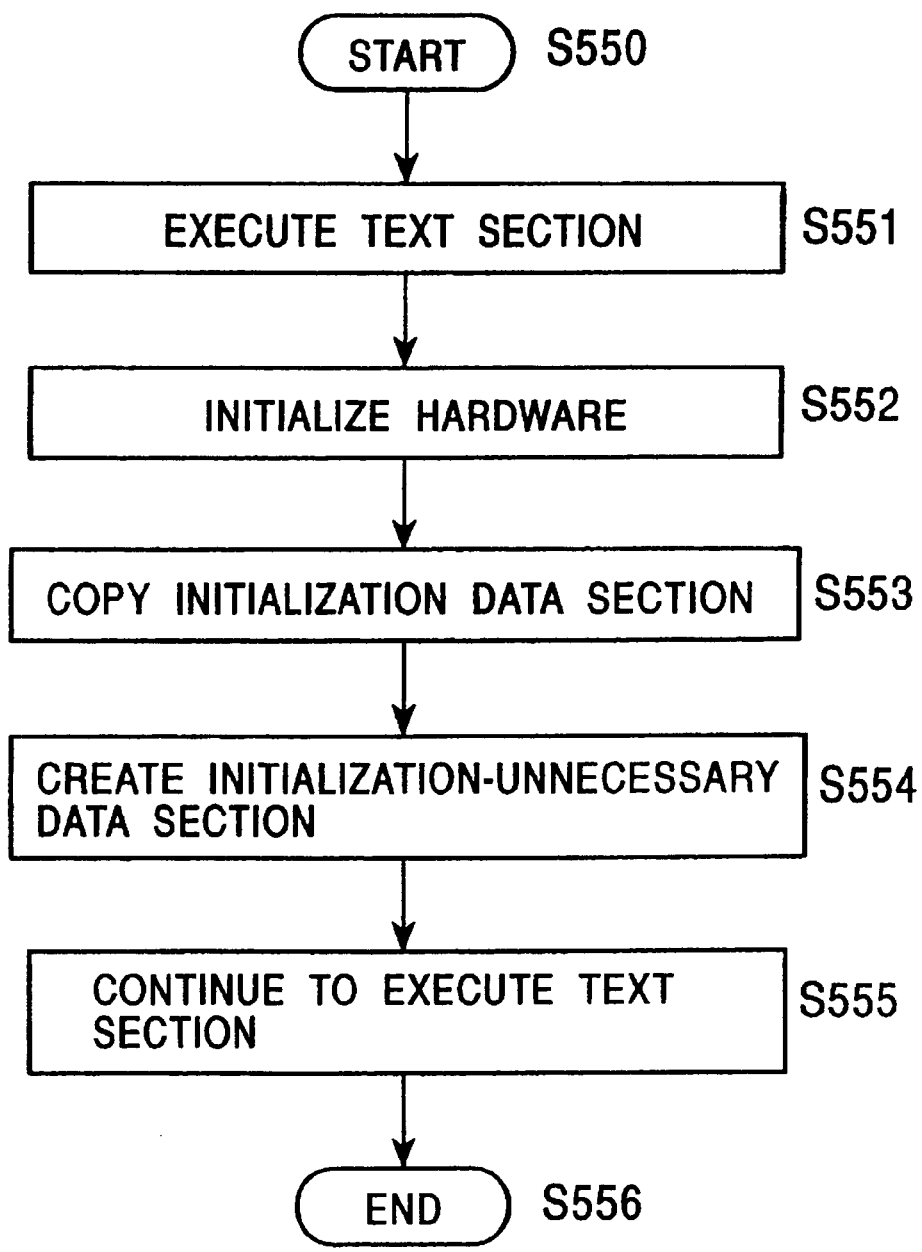
FIG. 31 is a block diagram illustrating an example of a conventional method for starting an execution program.
Figure 32:
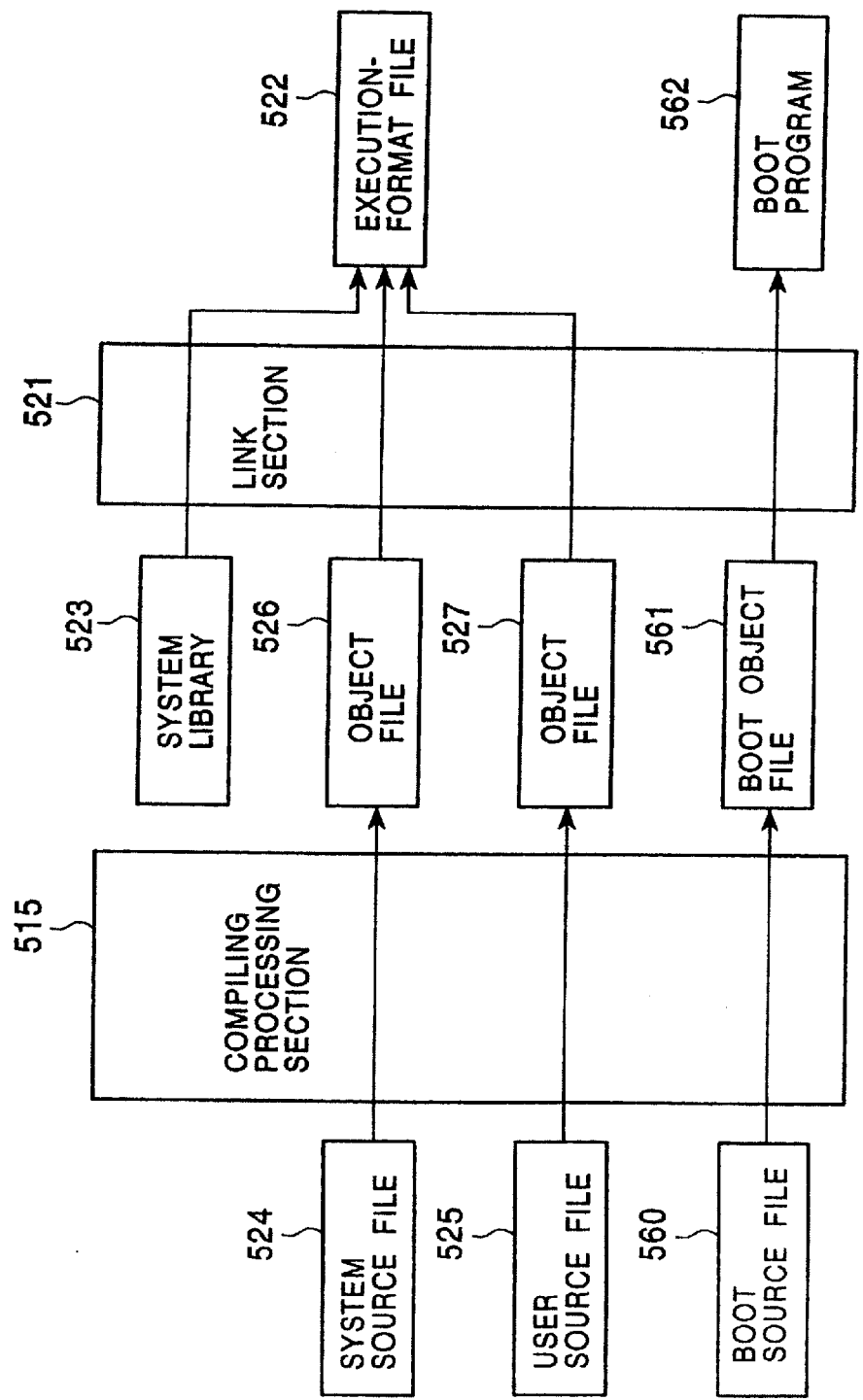
FIG. 32 is a block diagram illustrating another example of a conventional software development procedure.
Figure 33:
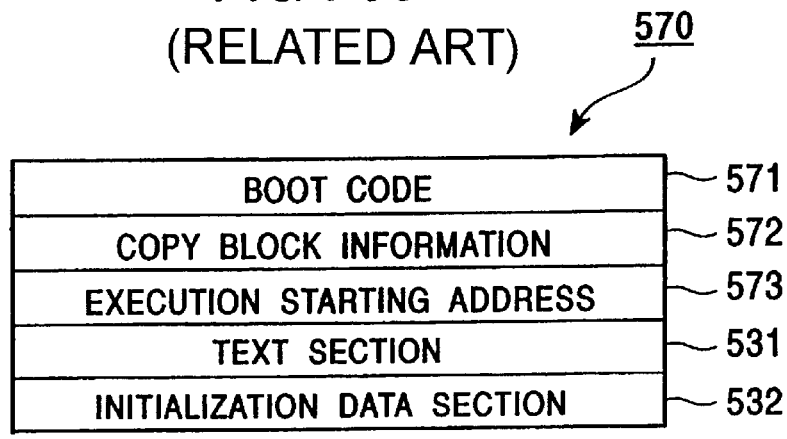
FIG. 33 illustrates the state of a conventional execution program on a ROM.
Figure 34:
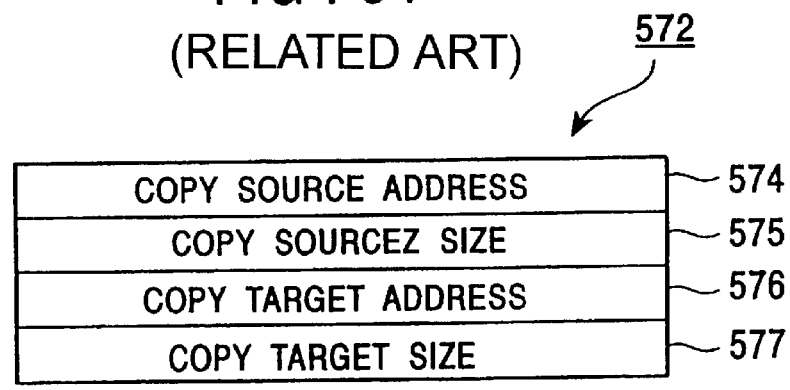
FIG. 34 illustrates one element of a copy block information group of the conventional execution program.
Figure 35:
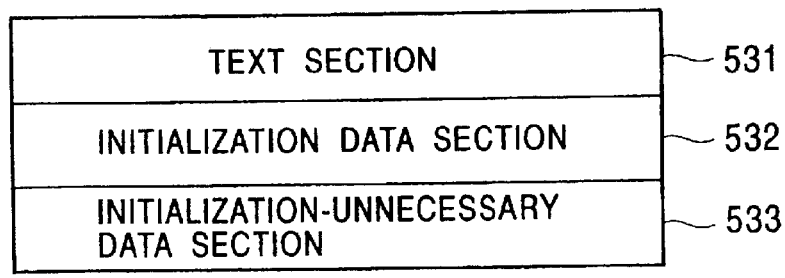
FIG. 35 illustrates the state of the conventional execution program in a RAM.
Figure 36:
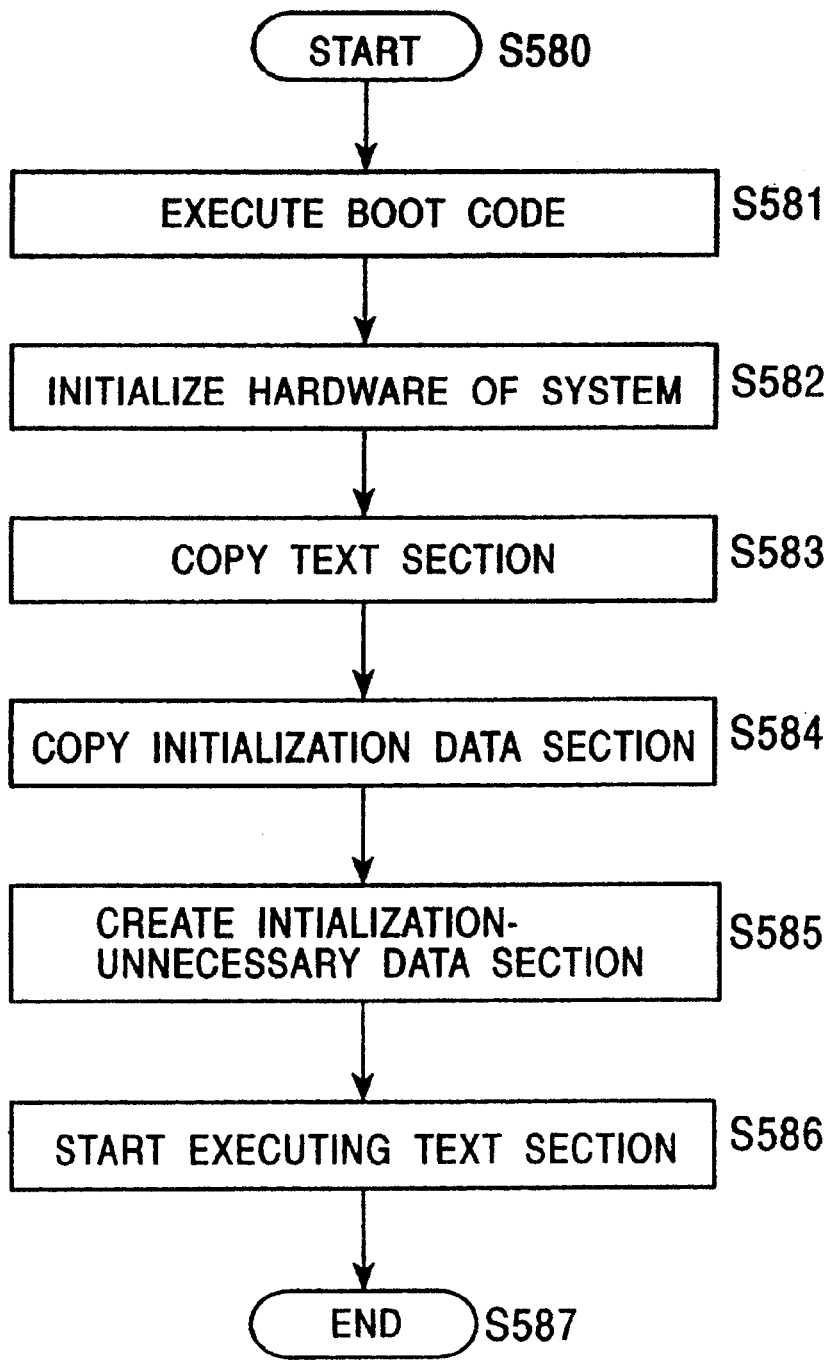
FIG. 36 is a block diagram illustrating another example of the conventional method for starting an execution program.

Next, an example of the display on the display section 151 in step S206 shown in FIG. 21 or in step S223 shown in FIG. 13 is described with reference to FIG. 24. In the example shown in FIG. 24, three modules contained in the complex execution-format file 24 installed in the storage device for storage are displayed on the screen of the display section 151. In FIG. 24, on the screen of the display section 151, a first module, a second module, and a third module are displayed at a display position 230, at a display position 231, and at a display position 232, respectively, and the priority of each module is displayed at a display position 233, at a display position 234, and at a display position 235, respectively. Also, a button 236, a button 237, and a button 238 are displayed in such a manner as to correspond to each module. The user selects the selection state and the non-selection state of each button by pressing each button via the input section 152, for example, such as a mouse. In FIG. 24, the button 236 and the button 237 show a selected state, and the button 238 shows a non-selected state.

On the screen of the display section 151, the total amount of memory used when the selected module is copied into the storage device for execution is displayed at the display position 239. That is, in the example shown in FIG. 24, the total of the memory capacities required by the first module and the second module is displayed at the display position 239.

Furthermore, on the screen of the display section 151, a button 240, a button 241, and a button 242 are shown. The button 240 is a button which is pressed when returning to the immediately previous setting. The button 241 is a button which is pressed when the procedure of the system setting is stopped. The button 242 is a button which is pressed when the selection of each module which is placed in a selected state in the above-described manner is determined, the process of step S206 or step S223 is terminated, and the process is made to proceed to the next step S207 or step S224.

As a result of the above procedure, the process of the system setting is terminated, and is thereafter followed by a process in the software development system, etc., shown in FIG. 1. As described above, the compiling information 12 output from the system setting section 150 is used to specify a compile form, etc., with respect to the compiler 13 in the software development system. The link information 17 output from the system setting section 150 is used to specify a link form, etc., with respect to the linker 18 in the software development system. The complex execution-format file information 21 output from the system setting section 150 is referred to, as information for the execution-format file 20 to be linked as the complex execution-format file 24, by the complex execution-format file creation section 22 in the software development system.

In the above-described system setting procedure, the system setting section 150 determines the priority of each module in accordance with the priority information 155 and automatically selects a module to be installed into the storage device of the software system to be installed. Therefore, according to the. system setting procedure, by interactively instructing the system setting section 150 by the user, it is possible to easily assign a desired module to the most appropriate storage device. At this time, for each module, a storage device in which the module is held and/or a storage device from which the module is executed are appropriately selected and assigned, respectively.

In addition, the system setting section 150 may determine the size of each module, the size of each storage device, the nonvolatile properties of each storage device, the writability of each storage device, the access speed of each storage device, etc., in accordance with not only the priority information 155, but also the system information 153, the storage device information 154, the module size information 156, etc., in order to select a storage device to which each module should be installed. This makes it possible for the system setting section 150 to more appropriately assign each module to each storage device. Specifically, for example, when the target software system to be installed includes not only a RAM and a ROM, but also various types of storage devices, such as an EEPROM, it is possible to assign each module to a storage device which fits the purpose by taking the access speed, writability, the nonvolatile properties, etc., of each storage device into consideration.

As has thus been described, in the information processing apparatus according to the present invention, the program location determination section determines which one of the storage devices is used to store and/or execute at least one program in accordance with priority information. As at result, according to the present invention, it is possible to appropriately and easily assign a plurality of programs to a plurality of storage devices, and it is easy to develop a software system to be installed which is capable of concurrently executing a plurality of programs which are formed into modules.

Furthermore, the information processing method according to the present invention determines which one of the storage devices is used to store and/or execute at least one program in accordance with priority information. As a result, according to the present invention, it is possible to appropriately and easily assign a plurality of programs to a plurality of storage devices, and it is easy to develop a software system to be installed which is capable of concurrently executing a plurality of programs which are formed into modules.

In addition, in the storage device manufacturing method according to the present invention, the program location determination section determines which one the storage devices is used to store and/or execute at least one program in accordance with priority information, and the program location determination section locates each program on each storage device in accordance with this determination result. As a result, according to the present invention, it is possible to appropriately and easily assign a plurality of programs to a plurality of storage devices, and it is easy to develop a software system to be installed which is capable of concurrently executing a plurality of programs which are formed into modules.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for supporting a software system, comprising:

program execution means having computation means and a plurality of storage means, for executing programs; and program location determination means for determining which one of the storage means is to be used to store and/or execute at least one program to be executed by said program execution means;

wherein said program location determination means performs said determination on the basis of priority information indicating the priority at which each of said programs should be operated in the software system.

2. An information processing apparatus according to claim 1, wherein said program location determination means performs said determination on the basis of storage means priority information indicating the priority of each of said storage means in addition to said priority information indicating the priority of each of said programs.

3. An information processing apparatus according to claim 1, wherein said program location determination means performs said determination on the basis of memory nonvolatile-property information indicating whether or not each of said storage means can maintain memory when electrical power is not supplied in addition to said priority information.

4. An information processing apparatus according to claim 1, wherein said program location determination means performs said determination on the basis of memory variable-property information indicating whether or not each of said storage means can change memory in addition to said priority information.

5. An information processing apparatus according to claim 1, further comprising address setting means for setting the address information of each of said programs on the basis of the determination result in said program location determination means.

6. An information processing apparatus according to claim 1, further comprising capacity determination means for determining whether or not said storage means can store each of said programs from the viewpoint of the memory capacity by comparing the memory capacity of each of said programs with storage means capacity information indicating the memory capacity of each of said storage means, wherein said program location determination means performs said determination on the basis of the determination result of said capacity determination means in addition to said priority information.

7. An information processing apparatus according to claim 6, wherein, with respect to each of said programs, said program capacity information indicates the memory capacity of a text section containing a program code and the memory capacity of a data section containing a data code which is referred to by said program code.

8. An information processing apparatus according to claim 7, wherein, with respect to each of said programs which are held in said storage means, said capacity determination means compares the total of the memory capacities of said text section and said data section with the memory capacity of said storage means.

9. An information processing apparatus according to claim 7, wherein said capacity determination means compares the total of the memory capacity of said data section of a program executed on said first storage means by said computation means and the memory capacity of said text section and said data section of a program which is copied from said first storage means to second storage means and which is executed on said second storage means by said computation means among each of said programs held by the first storage means, with the memory capacity of said second storage means.

10. An information processing method for assigning programs to be executed by program execution means having at least computation means and a plurality of storage means used to store and/or execute at least one program, said information processing method comprising the steps of:

reading priority information indicating the priority of each of said programs; and determining the assignment of each of said programs within one of said storage means on the basis of said priority information.

11. An information processing method according to claim 10, further comprising, in a stage preceding said determining step, reading storage means priority information indicating the priority of each of said storage means, wherein the assignment of each of said programs is determined on the basis of said storage means priority information in addition to said priority information indicating the priority of each of said programs.

12. An information processing method according to claim 10, further comprising, in a stage preceding said determining step, reading memory nonvolatile-property information indicating whether or not each of said storage means can maintain memory when electrical power is not supplied, wherein, in said determining step, the assignment of each of said programs is determined on the basis of said memory nonvolatile-property information in addition to said priority information.

13. An information processing method according to claim 10, further comprising, in a stage preceding said determining step, reading memory variable-property information indicating whether or not each of said storage means can change memory, wherein, in said determining step, the assignment of each of said programs is determined on the basis of said memory variable-property information in addition to said priority information.

14. An information processing method according to claim 10, further, in a stage after said determining step, setting address information provided in each of said programs on the basis of the determination result in said determining step.

15. An information processing method according to claim 10, further comprising:

in a stage preceding said determining step, reading storage means capacity information indicating the memory capacity of each of said storage means;

reading program capacity information indicating the memory capacity of each of said programs; and determining whether or not said storage means can store each of said programs from the viewpoint of the memory capacity by comparing said storage means capacity information with said program capacity information, and thereby obtaining a determination result;

wherein the assignment of each of said programs is determined on the basis of the determination result in addition to said priority information.

16. An information processing method according to claim 15, wherein, in said fourth step, with respect to each of said programs, the memory capacity of a text section containing a program code and the memory capacity of a data section containing a data code which is referred to by said program code are read from said program capacity information.

17. An information processing method according to claim 16, wherein, in said fifth step, with respect to each of said programs held by said storage means, the total of the memory capacities of said text section and said data section is compared with the memory capacity of said storage means.

18. An information processing method according to claim 16, wherein, in said fifth step, the total of the memory capacity of said data section of a program which is executed on said first storage means by said computation apparatus and the memory capacities of said text section and said data section of a program which is copied from said first storage means into second storage means and which is executed on said second storage means by said computation apparatus among each of said programs held by the first storage means is compared with the memory capacity of said second storage means.

19. A program writing apparatus for writing at least one program into program execution means having at least computation means and a plurality of storage means, said program writing apparatus comprising:

program location determination means for determining which one of said storage means is used to store and/or execute each of said programs on the basis of priority information indicating the priority at which each of said programs should be operated in a software system; and program wring means for writing each of said programs into a respective one of said storage means, in accordance with the determination result of said program location determination means.

20. A program writing apparatus according to claim 19, wherein said program location determination means performs said determination on the basis of storage means priority information indicating the priority of each of said storage means in addition to said priority information indicating the priority of each of said programs.

21. A program writing apparatus according to claim 19, wherein said program location determination means performs said determination on the basis of memory nonvolatile-property information indicating whether or not each of said storage means can maintain memory when electrical power is not supplied in addition to said priority information.

22. A program writing apparatus according to claim 19, wherein said program location determination means performs said determination on the basis of memory variable-property information indicating whether or not each of said storage means can change memory in addition to said priority information.

23. A program writing apparatus according to claim 19, further comprising address setting means for setting the address information of each of said programs on the basis of the determination result in said program location determination means, wherein said program writing means also writes the address information set by said address setting means when each of said programs is written into each of said storage means, respectively.

24. A program writing apparatus according to claim 19, further comprising capacity determination means for determining whether or not said storage means can store each of said programs from the viewpoint of the memory capacity by comparing storage means capacity information indicating the memory capacity of each of said programs with program capacity information indicating the memory capacity of each of said programs, wherein said program location determination means performs said determination on the basis of the determination result of said capacity determination means in addition to said priority information.

25. A program writing apparatus according to claim 24, wherein, with respect to each of said programs, said program capacity information indicates the memory capacity of a text section containing a program code and the memory capacity of a data section containing a data code which is referred to by said program code.

26. A program writing apparatus according to claim 25, wherein, with respect to each of said programs which are held in said storage means, said capacity determination means compares the total of the memory capacities of said text section and said data section with the memory capacity of said storage means.

27. A program writing apparatus according to claim 25, wherein said capacity determination means compares the total of the memory capacity of said data section of a program executed on said first storage means by said computation apparatus and the memory capacity of said text section and said data section of a program which is copied from said first storage means to second storage means and which is executed on said second storage means by said computation means among each of said programs held by the first storage means, with the memory capacity of said second storage means.

* * * * *